US012720374B2

(12) United States Patent
Akl et al.

(10) Patent No.: US 12,720,374 B2
(45) Date of Patent: Aug. 25, 2026

(54) ADJUSTMENT OF SYNCHRONIZATION SIGNAL BLOCK TRANSMISSIONS FOR REPEATER DEVICE MIGRATION

(71) Applicant: QUALCOMM Incorporated, San Diego, CA (US)

(72) Inventors: Naeem Akl, Bridgewater, NJ (US); Navid Abedini, Basking Ridge, NJ (US); Jianghong Luo, Skillman, NJ (US); Karl Georg Hampel, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 418 days.

(21) Appl. No.: 18/298,698

(22) Filed: Apr. 11, 2023

(65) Prior Publication Data

US 2024/0349130 A1 Oct. 17, 2024

(51) Int. Cl.
*H04W 36/00* (2009.01)
*H04W 56/00* (2009.01)

(52) U.S. Cl.
CPC ... *H04W 36/0058* (2018.08); *H04W 56/0015* (2013.01); *H04W 36/03* (2018.08)

(58) Field of Classification Search
CPC ......... H04W 36/0005; H04W 36/0055; H04W 36/0058; H04W 36/0061; H04W 36/0083; H04W 36/00833; H04W 36/0088; H04W 36/0094; H04W 56/001; H04W 56/0015; H04W 56/0025; H04W 84/005; H04W 84/04; H04W 84/042; H04W 84/047
See application file for complete search history.

(56) References Cited

U.S. PATENT DOCUMENTS

| | | | | |
|---|---|---|---|---|
| 2011/0211521 A1* | 9/2011 | Baba | H04W 56/0085 370/315 |
| 2022/0174770 A1* | 6/2022 | Wang | H04W 76/18 |
| 2023/0170962 A1* | 6/2023 | Ali | H04B 7/0626 370/252 |

FOREIGN PATENT DOCUMENTS

| | | | | |
|---|---|---|---|---|
| CN | 105850176 B | * 8/2020 | H04L 61/6054 |
| CN | 113853822 A | * 12/2021 | H04B 7/0695 |

* cited by examiner

*Primary Examiner* — Matthew W Genack
(74) *Attorney, Agent, or Firm* — Holland & Hart LLP

(57) ABSTRACT

Methods, systems, and devices for wireless communication are described. The method may include a first network entity receiving, from a repeater device, a report that indicates signal measurements associated with a first cell and transmitting, based at least in part on the report, a first signal that indicates to adjust transmission of synchronization signal blocks (SSB) by a second network entity using the first cell. Further, the method may include transmitting, based at least in part on the first signal, a second signal that indicates to perform a handover operation for the repeater device from a second cell to the first cell.

28 Claims, 12 Drawing Sheets

ADJUSTMENT OF SYNCHRONIZATION SIGNAL BLOCK TRANSMISSIONS FOR REPEATER DEVICE MIGRATION

FIELD OF TECHNOLOGY

The following relates to wireless communication, including adjustment of synchronization signal block (SSB) transmissions for repeater device migration.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some examples, a wireless communications system may support a repeater device. The repeater device may connect to a network entity and forward signaling from the network entity to one or more UEs. One of the roles of the repeater device may be to increase coverage for the network entity. Further, in some examples, the repeater device may be stationary and may be inserted into the wireless communications system based on network planning.

SUMMARY

The described techniques relate to improved methods, systems, devices, and apparatuses that support adjustment of synchronization signal block (SSB) transmissions for repeater device migration. The method may include a first network entity receiving, from a repeater device, a report that indicates signal measurements associated with a first cell. Based on the report, the first network entity may determine that migrating the repeater device from a second cell to the first cell may be beneficial and as such, may transmit a first signal that indicates to adjust transmission of a number of SSBs by a second network entity using the first cell. Further, the first network entity may transmit, based on the first signal, a second signal that indicates to perform a handover operation for the repeater device from the second cell to the first cell. In some cases, the second network entity may adjust transmission of the number of SSBs prior to or after connecting with the first cell. The methods as described herein may allow to a network entity to adjust SSB transmission based on repeater migration which may reduce overhead signaling and decrease power consumption of the network.

DETAILED DESCRIPTION

Figure 1:
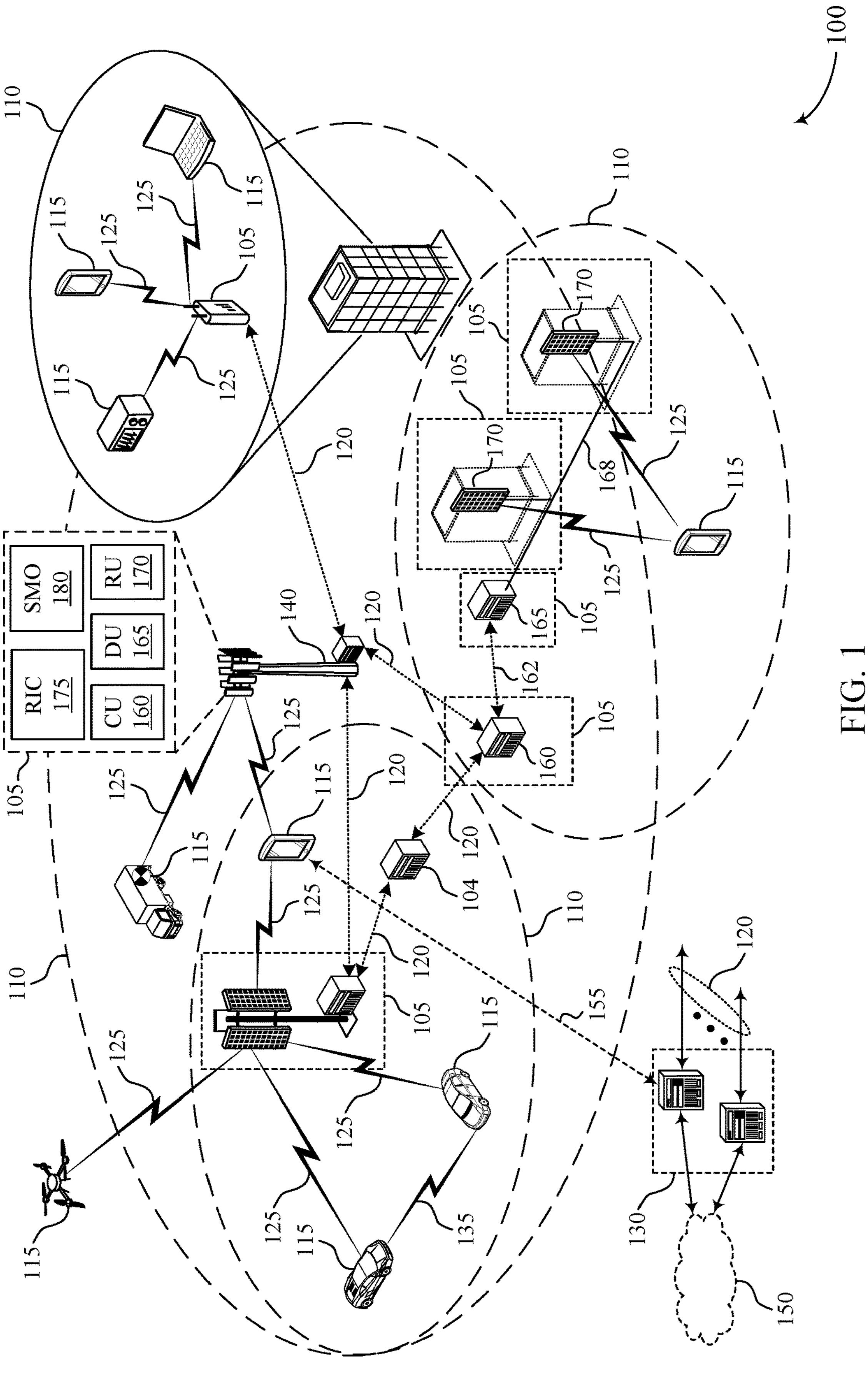
FIG. 1 shows an example of a wireless communications system that supports adjustment of SSB transmissions for repeater device migration in accordance with one or more aspects of the present disclosure.

In a wireless communications system, a first cell may utilize a repeater device to amplify and forward signals such that a network entity supporting the first cell may communicate with user equipment (UEs) that may otherwise be out of range of the first cell or have poor connection to the first cell. As an example, the network entity may transmit a series of synchronization signal blocks (SSBs) using a directional beam pointed in the direction of the repeater device and the repeater device may fan out the SSBs to one or more UEs. In some cases, the wireless communications system may support migration of the repeater device. For example, a repeater device may move from a first cell to a second cell due to environmental changes. To support repeater migration, all candidate cells (e.g., cells considered for handover) may transmit repeater-dedicated SSBs (e.g., series of SSBs transmitted using a directional beam directed toward the repeater device). For example, a network entity supporting the second cell may transmit repeater-dedicated SSBs while the repeater device is connected to the first cell and vice versa. However, transmitting repeater-dedicated SSBs via a cell that is not connected to the repeater-device may not be beneficial and may instead result in large overhead and excess energy consumption.

As described herein, a network entity may adjust (e.g., activate and deactivate) repeater-dedicated SSBs to reduce overhead signaling and network power consumption during repeater migration or handover. In one example, the repeater device may be connected to a first cell that is supported by a first distributed unit (DU) and transmit a measurement report (e.g., an radio resource control (RRC) measurement report) associated with the second cell to a central unit (CU) that is connected to the first DU. Based on the measurement report, the CU may determine whether to migrate the repeater device to a second cell that is supported by the first DU or a second DU. If the CU determines a handover may be beneficial, the CU may transmit a signal indicating to adjust transmission of SSBs via the second cell. For example, the signal may indicate to activate transmission of repeater-dedicated SSBs via the second cell. Further, the CU may transmit a command to the repeater device to perform handover such that the repeater device may connect with the second cell. In some examples, activation of the repeater-dedicated SSB of the second cell may occur before or after the repeater device is connected to the second cell. Further, the CU may transmit assistance information that indicates the number of repeater-dedicated SSBs to be activated, a direction of repeater-dedicated SSBs, time occasions on which the SSBs will be activated, etc. Using such method may allow a network entity to transmit repeater-dedicated SSB during a time period prior to or after repeater migration which may reduce overhead and power consumption at the network.

Aspects of the disclosure are initially described in the context of wireless communications systems. Additional aspects of the disclosure are described in the context of a network architecture and process flows. Aspects of the disclosure are further illustrated by and described with reference to apparatus diagrams, system diagrams, and flowcharts that relate to adjustment of SSB transmissions for repeater device migration.

FIG. 1 shows an example of a wireless communications system 100 that supports adjustment of SSB transmissions for repeater device migration in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support adjustment of SSB transmissions for repeater device migration as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI)

may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

As described herein, the wireless communications system 100 may support adjustment of SSB transmissions for repeater device migration. In some cases, a repeater device may migrate from a first cell to a second cell. The network entity 105 may support the first cell while a different network entity 105 may support the second cell. When it is determined that handover from the first cell to the second cell may be beneficial (e.g., based on measurement reports received from the repeater device), the network entity 105 that supports the second cell may receive signaling indicating to adjust transmission of SSBs. For example, the signaling may indicate to activate transmission of repeater-dedicated SSBs (e.g., SSBs transmitted in the direction of the repeater device, SSBs to be forwarded by the repeater device). In response to the signaling, the network entity 105 that supports the second cell may activate transmission of repeater-dedicated SSB using the second cell. Activation of the repeater-dedicated SSBs may occur prior to the repeater device connecting to the second cell or after. The methods as described herein may reduce overhead and power consumption of the network.

Figure 2:
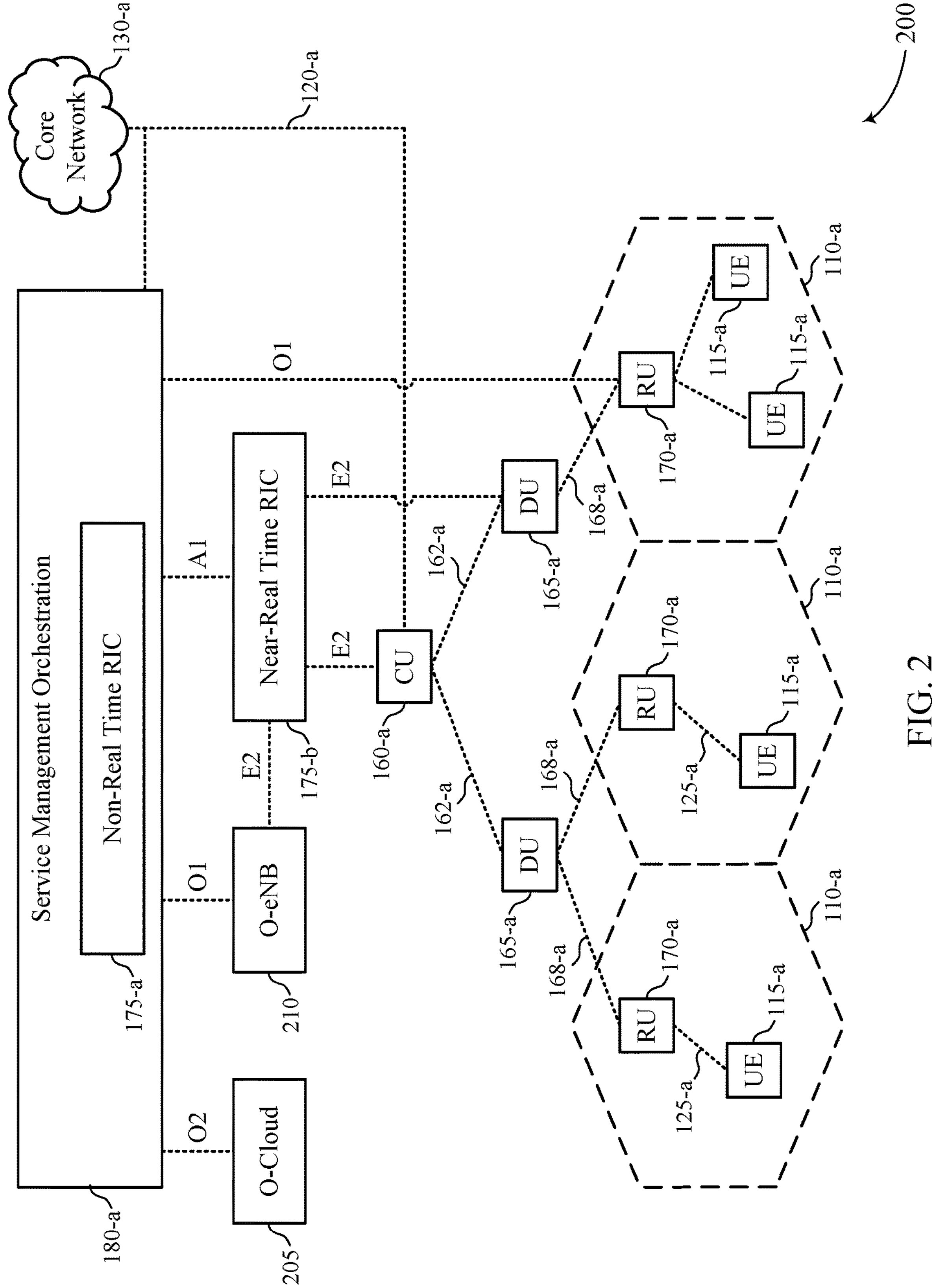
FIG. 2 shows an example of a network architecture that supports adjustment of SSB transmissions for repeater device migration in accordance with one or more aspects of the present disclosure.

FIG. 2 shows an example of a network architecture 200 (e.g., a disaggregated base station architecture, a disaggregated RAN architecture) that supports adjustment of SSB transmissions for repeater device migration in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via 01) or via generation of RAN management policies (e.g., A1 policies).

As described herein, the network architecture 200 may support adjustment of SSB transmissions for repeater device migration. In some cases, a repeater device may migrate from a first cell to a second cell. The DU 165 may support the first cell while a different or same DU 165 may support the second cell. A CU 160 in connection with the DU 165 (e.g., one or both of the DU 165 supporting the first cell or the DU 165 supporting the second cell) may determine that handover from the first cell to the second cell may be beneficial (e.g., based on measurement reports received from the repeater device) and may transmit signaling to the DU 165 that supports the second cell indicating to adjust transmission of SSBs. For example, the signaling may indicate to activate transmission of repeater-dedicated SSBs (e.g., SSBs transmitted in the direction of the repeater device, SSBs to be forwarded by the repeater device). In response to the signaling, the DU 165 that supports the second cell may activate transmission of repeater-dedicated SSB using the second cell. Activation of the repeater-dedicated SSBs may occur prior to the repeater device connecting to the second cell or after. The methods as described herein may reduce overhead and power consumption of the network.

Figure 3:
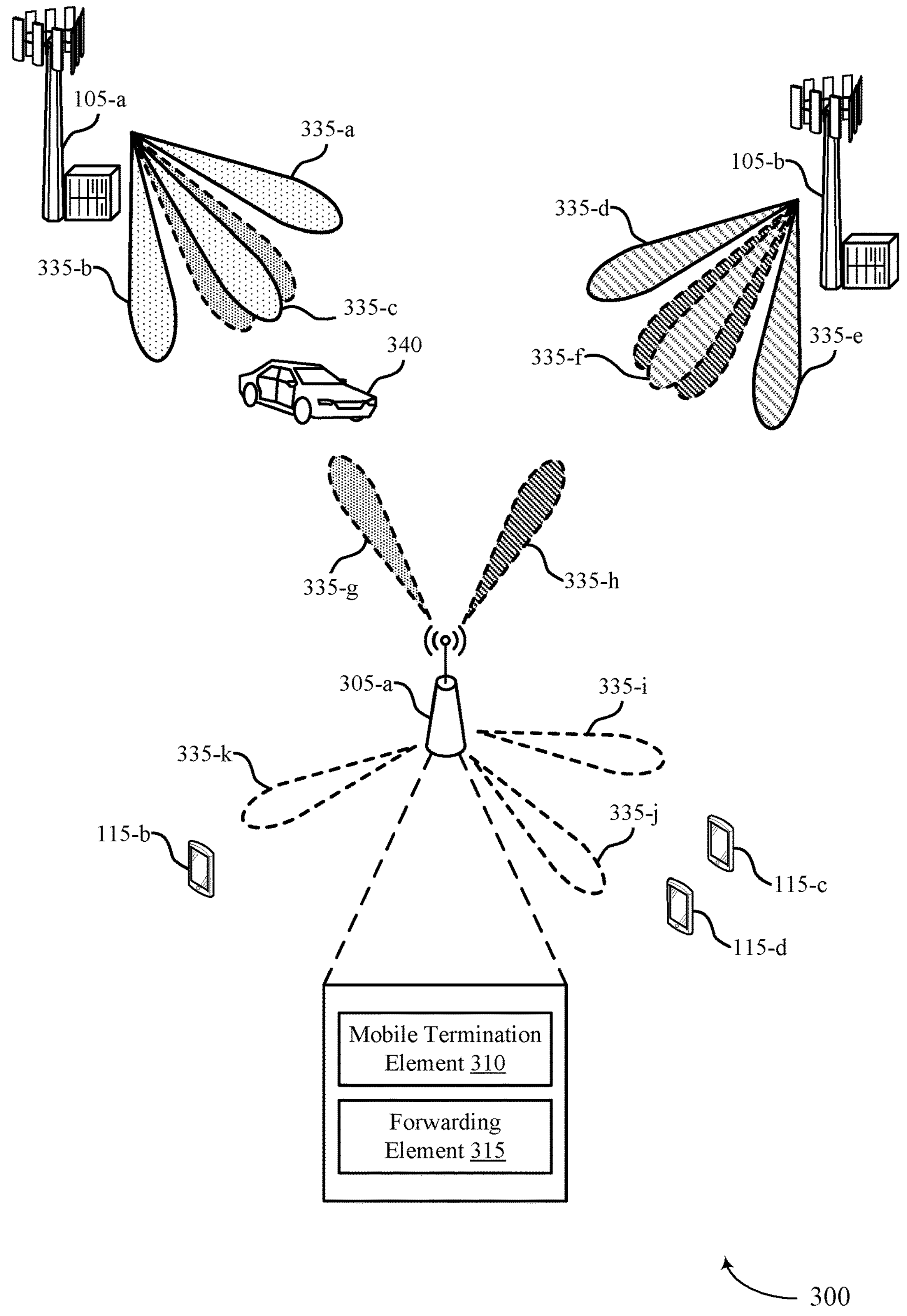
FIG. 3 shows an example of a wireless communications system that supports adjustment of SSB transmissions for repeater device migration in accordance with one or more aspects of the present disclosure.

FIG. 3 shows an example of a wireless communications system 300 that supports adjustment of SSB transmissions for repeater device migration in accordance with one or more aspects of the present disclosure. In some examples, the wireless communications system 300 may implement aspects or be implemented by aspects of the wireless communications system 100, the network architecture 200, or both. For example, the wireless communications system 300 may include a network entity 105-*a* and a network entity 105-*b* which may be examples of network entities 105 as described with reference to FIG. 1 or DUs 165 as described with reference to FIG. 2. Further, the wireless communications system 300 may include a UE 115-*b*, a UE 115-*c*, and a UE 115-*d* which may be examples of UEs 115 as described with reference to FIGS. 1 and 2.

In some cases, the wireless communications system 300 may support a repeater 305-*a*. The repeater 305-*a* may allow a network entity 105 to amplify and forward signals to UEs 115 that the network entity 105 may not otherwise communicate with. The repeater 305-*a* (e.g., a network-controlled repeater) may include one or more of a mobile termination element 310 or a forwarding element 315. The mobile termination element 310 may be responsible for the exchange of control information between the repeater 305-*a* and the network entity 105 (e.g., the network entity 105-*a* or the network entity 105-*b*) and as such, a Uu-based control link may be formed between the network entity 105 and the mobile termination element 310 of the repeater 305-*a*. The control information may include beam information for an access link (i.e., a link between the repeater 305-*a* and a UE 115), an uplink or downlink time division duplexing (TDD) configuration, on/off information, power control information, etc.

Alternatively, the forwarding element 315 may be responsible for amplifying and forwarding signals (e.g., either uplink or downlink) between the network entity 105 and the UE 115. As such, a backhaul link may be formed between the network entity 105 and the forwarding element 315 of the repeater 305-*a* and additionally, an access link may be formed between the forwarding element 315 of the repeater 305-*a* and the UE 115. The network entity 105 may transmit a signal to the forwarding element 315 of the repeater 305-*a* via the backhaul link and the forwarding element 315 of the repeater 305-*a* may forward and amplify the signal to the UE 115 via the access link. In some cases, at least one of the carriers configured for the mobile termination element 310 may operate in a frequency band forwarded by the forwarding element 315. Further, in some examples, communication on the control link may occur simultaneously with communication on the backhaul link. In other examples, communication on the control link may be time-domain multiplexed (TDM'd) with the communication on the backhaul link. The ability to perform communications on the backhaul link and the control link simultaneously or not may be based on a capability of the repeater 305-*a*.

In some cases, the network entity 105 (e.g., the network entity 105-*a* or the network entity 105-*b*) may transmit one or more SSBs (e.g., combinations of a primary synchronization signal (PSS), a secondary synchronization signal (SSS), and a physical broadcast channel (PBCH) signal) to UEs 115. The network entity 105 may transmit the SSBs as part of a beam selection procedure or to establish downlink synchronization with the UEs 115. In some examples, the network entity 105 may beam sweep the SSBs. For example, as shown in FIG. 3, the network entity 105-*a* may transmit a first SSB via the directional beam 335-*a*, a second SSB via the directional beam 335-*b*, and a third SSB via the directional beam 335-*c*. To extend the reach of the SSBs or to service a coverage hole, the network entity 105 may utilize the repeater 305-*a*.

In one example, the repeater 305-*a* may establish a connection with the network entity 105-*a*. When connected to the repeater 305-*a*, the network entity 105-*a* may transmit multiple SSBs (e.g., repeater-dedicated SSBs) using a directional beam 335 that is pointed towards the repeater 305-*a* (e.g., the directional beam 335-*c* or beams QCL'd with directional beam 335-*c*). Additionally, the network entity 105-*a* may transmit SSBs (e.g., non-repeater dedicated SSBs) via directional beams 335 not pointed towards the repeater 305-*a* (e.g., the directional beam 335-*a* and the directional beam 335-*b*). The repeater 305-*a* may receive the multiple SSBs (e.g., the repeater-dedicated SSBs) using the directional beam 335-*g* and fan out the multiple SSBs using a directional beam 335-*i*, a directional beams 335-*j*, and a directional beam 335-*k* such that the SSBs may be received by the UE 115-*a*, the UE 115-*b*, and the UE 115-*c*.

In some cases, the repeater 305-*a* may support handover. Handover may occur when the backhaul link between the network entity 105 and the repeater 305-*a* degrades. For example, the backhaul link between the network entity 105-*a* and the repeater 305-*a* may degrade as a result of an environmental change. The environmental change may include a blockage between the network entity 105-*a* and the repeater 305-*a* such as a vehicle 340 as shown in FIG. 3. In the case that the backhaul link between the network entity 105-*a* and the repeater 305-*a* degrades, the repeater 305-*a* may migrate from the network entity 105-*a* to the network entity 105-*b* such that the UEs 115 (e.g., the UE 115-*a*, the UE 115-*b*, and the UE 115-*c*) continue to be supported by the network. In another example, the repeater 305-*a* may perform handover to the network entity 105-*b* if the network entity 105-*a* becomes overloaded. The repeater 305-*a* may migrate to the network entity 105-*b* to relieve the load on the network entity 105-*a*. In another example, the repeater 305-*a* may perform handover to the network entity 105-*b* such that the network entity 105-*a* (e.g., source side) may perform energy savings.

In some examples, to support repeater migration, all candidate network entities 105 (e.g., both the network entity 105-*a* and the network entity 105-*b*) may transmit repeater-dedicated SSBs. Repeater-dedicated SSBs may be described as multiple SSBs transmitted in the direction of the repeater 305-*a*. For example, to support repeater migration, the network entity 105-*a* may transmit multiple repeater-dedicated SSBs via the directional beam 335-*c* or using directional beams 335 directed in a similar direction as directional beam 335-*c* (as well as non-repeater dedicated SSBs via the directional beam 335-*a* and the directional beam 335-*b*) and additionally, the network entity 105-*b* may transmit multiple repeater-dedicated SSBs via the directional beam 340-*f* or using directional beams 335 directed in a similar direction as directional beam 335-*f* (as well as non-repeater-dedicated SSBs via the directional beam 335-*d* and the directional beam 335-*e*).

When the repeater 305-*a* is connected to the network entity 105-*a*, the repeater 305-*a* may receive the multiple SSBs (e.g., repeater-dedicated SSBs) using the directional beam 335-*g* and fan out the multiple SSBs using a directional beam 335-*i*, a directional beams 335-*j*, and a directional beam 335-*k*. Similarly, when the repeater 305-*a* is connected to the network entity 105-*b*, the repeater 305-*a* may receive the multiple SSBs (e.g., repeater-dedicated SSBs) using the directional beam 335-*f* and fan out the multiple SSBs using a directional beam 335-*i*, a directional beams 335-*j*, and a directional beam 335-*k*

The SSB pattern is preconfigured for the candidate network entities 105 via Operations, Administration, and Management (OAM). As such, a candidate network entity 105 will transmit repeater-dedicated SSBs regardless of whether the candidate network entity 105 is connected to the repeater 305-*a*. For example, while the repeater 305-*a* is connected to the network entity 105-*a*, the network entity 105-*b* may redundantly transmit the multiple repeater-dedicated SSBs resulting in an increase in overhead. The overhead may increase even further if the number of candidate network entities increase or if the number of directional beams 335 pointed towards the repeater 305-*a*.

To address the large overhead and power consumption associated with redundant transmission of repeater-dedicated SSBs during repeater migration, repeater-dedicated SSBs may be activated or deactivated based on need. In some examples, the network entity 105-*a* and the network entity 105-*b* may be implemented in a disaggregated architecture. For example, the network entity 105-*a* may be an example of a first DU that supports a first cell and the network entity 105-*b* that supports a second cell may be an example of a second DU. The first DU and the second DU may be supported by a same CU or a different CU. In another example, the network entity 105-*a* and the network entity 105-*b* may be an example of a single DU that supports two different cells. For example, the network entity 105-*a* may be an example of the DU that support a first cell and the network entity 105-*b* may be an example of the DU that supports a second cell. The following methods can apply to any of the above examples of a disaggregated architecture.

Initially, the network entity 105-*a* may be connected to the repeater 305-*a*. While connected to the repeater 305-*a*, the network entity 105-*a* may transmit more than one repeater-dedicated SSB via the directional beam 335-*c* as well as non-repeater-dedicated SSBs via the directional beams 335-*a* and the directional beam 335-*b* (e.g., using the first cell). Additionally, the repeater 305-*a* may perform measurements on signals received from the network entity 105-*a* as well as the network entity 105-*b* and the repeater 305-*a* may transmit a measurement report including the measurements to a CU (e.g., a CU connected to the network entity 105-*a* or the network entity 105-*b*). Using the measurements, the CU may determine whether handover may be beneficial. The CU may determine handover may be beneficial if the measurements indicate that the backhaul link between the network entity 105-*a* and the repeater 305-*a* is degrading. If the CU determines handover may be beneficial, the CU may transmit a first signal to the network entity 105-*b* indicating to adjust repeater-dedicated SSB transmission. Prior to receiving the first signal, the network entity 105-*b* performed a single SSB transmission via the directional beam 335-*f* as well as SSB transmission via the directional beam 335-*d* and the directional beam 335-*e* (e.g., using the second cell).

In one example, the first signal may indicate to activate transmission of repeater-dedicated SSBs at the network entity 105-*b*. In such case, in response to the first signal, the network entity 105-*b* may transmit more than one SSB via the directional beam 335-*f* or increase the number of SSBs transmitted via the directional beam 335-*f*. In some examples, the CU may transmit assistance information to the network entity 105-*b* regarding the activation of repeater-dedicated SSBs. The assistance information may include an indication of a number of repeater-dedicated SSBs to be activated, a directional beam 335 over which to transmits the repeater-dedicated SSBs, time occasions on which the SSBs will be activated, etc. In some examples, the activation of the repeater-dedicated SSBs at the network entity 105-*b* may occur prior to or after the repeater 305-*a* connects to the network entity 105-*b*. Further, after handover is performed, the CU may transmit a second signal to the network entity 105-*a* indicating to deactivate transmission of repeater-dedicated SSBs. In such case, after receiving the second signal, the network entity 105-*a* may transmit a single SSB via the directional beam 335-*c* as opposed to multiple SSBs. The methods as described herein may allow a network entity 105 to adjust repeater-dedicated SSB transmission which may support repeater migrations while reducing overhead and power consumption.

Figure 4:
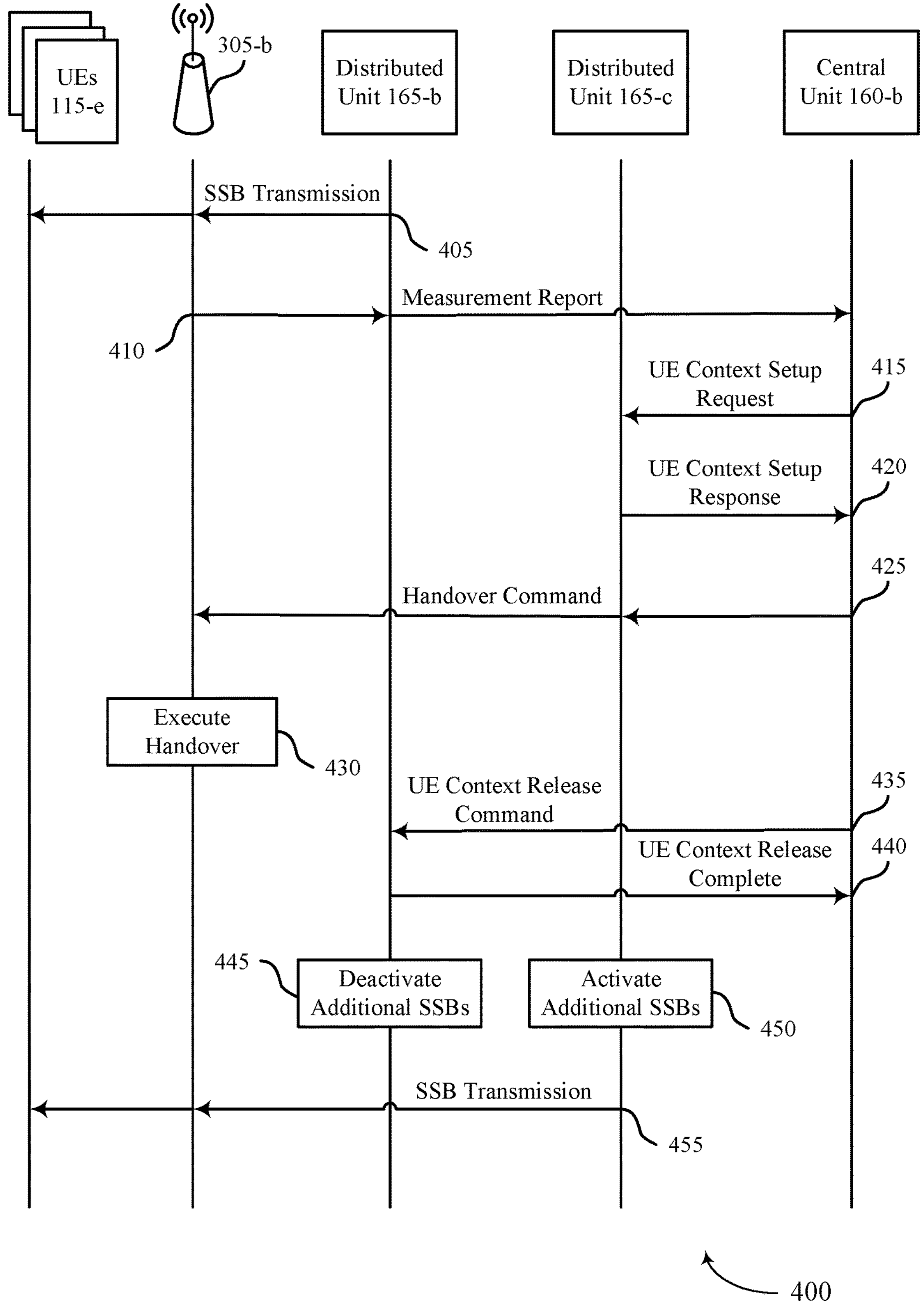
FIGS. 4, 5, and 6 show examples of a process flow that supports adjustment of SSB transmissions for repeater device migration in accordance with one or more aspects of the present disclosure.

FIG. 4 shows an example of a process flow 400 that supports adjustment of SSB transmissions for repeater device migration in accordance with one or more aspects of the present disclosure. In some examples, the process flow 400 may implement or be implemented by aspects of the wireless communications system 100, the network architecture 200, or the wireless communications system 300. For example, the process flow 400 may include UEs 115-*e* which may be examples of UEs 115 as described with reference to FIGS. 1, 2, and 3. Further, the process flow 400 may include a DU 165-*b*, a DU 165-*c*, and a CU 160-*b* which may be examples of DUs 165 and a CU 160 as described in FIG. 2, respectively. Moreover, the process flow 400 may include a repeater 305-*b* which may be an example of a repeater 305-*a* as described with reference to FIG. 3. Alternative examples of the following may be implemented, where some steps are performed in a different order than described or are not performed at all. In some cases, steps may include additional features not mentioned below, or further steps may be added.

In some examples, a wireless communications system may support a disaggregated architecture. In a disaggregated architecture, a network entity may include at least a CU 160 that supports one or more DUs 165. In the example of FIG. 4, a single CU 160-*b* may support a DU 165-*b* and a DU 165-*c*. Further, the DU 165-*b* and the DU 165-*c* may support different cells. For example, the DU 165-*b* may support communication over a first cell and the DU 165-*c* may support communication over a second cell.

In some examples, the DU 165-*b* may establish a connection with the repeater 305-*b* and at 405, the DU 165-*b* may transmit two or more SSBs to the repeater 305-*b* (e.g., using one or more directional beams pointed in the direction of the repeater 305-*b*) and the repeater 305-*b* may forward the two or more SSBs to the UEs 115-*e* (e.g., UEs outside the coverage area of the DU 165-*b*).

At 410, the repeater 305-*b* may transmit a measurement report to the DU 165-*b* and the DU 165-*b* may forward the measurement report to the CU 160-*b*. The measurement report may include signal measurements associated with one or both of the first cell (e.g., supported by the DU 165-*b*) or the second cell (e.g., supported by the DU 165-*c*). In some examples, the repeater 305-*b* may measure signals received from one or both of the DU 165-*b* or the DU 165-*c* and transmit the measurement report to the CU 160-*b* according to a periodicity. In some cases, the measurement report may be included in an RRC message. Based on the measurement report, the CU 160-*b* may determine that performing a handover of the repeater 305-*b* from the DU 165-*b* to the DU 165-*c* may be beneficial.

At 415, after determining that the handover may be beneficial, the CU 160-*b* may transmit a UE context setup request message to the DU 165-*c* to establish a UE context for the repeater 305-*b* (e.g., a mobile termination element of the repeater 305-*b*) at the DU 165-*c*. In some cases, the UE context setup request message may include an indication to adjust transmission of SSBs. For example, the UE context setup request message may include a request to activate repeater-dedicated SSBs for transmission by the DU 165-*c*. Repeater-dedicated SSBs may be described as a set of two or more SSBs that are transmitted in the direction of the repeater 305-*b*.

At 420, the DU 165-*c* may transmit, to the CU 160-*b*, a UE context setup response message. The UE context setup response message may indicate successful receipt of the UE context setup request message, and in some examples, confirm the setup of the UE context at the DU 165-*c*.

At 425, the CU 160-*b* may transmit a handover command to the DU 165-*c* and the DU 165-*c* may forward the handover command to the repeater 305-*b*. The handover command may instruct the repeater 305-*b* to perform a handover procedure to transition from the DU 165-*b* to the DU 165-*c*. In some cases, the handover command may be included in an RRC message.

At 430, the repeater 305-*b* may perform a handover operation. Upon a successful handover procedure (e.g., after detecting successful access of the repeater 305-*b*), the DU 165-*c* may activate the repeater-dedicated SSB transmissions at 450 and transmit the repeater-dedicated SSBs to the repeater 305-*b* at 455. The repeater 305-*b* may then fan out the repeater-dedicated SSBs to the UEs 115-*e*. Further, upon a successful handover procedure, the DU 165-*b* may disconnect from the repeater 305-*b*. To disconnect from the repeater 305-*b*, the CU 160-*b* may transmit a UE context release command to the DU 165-*b* at 435. The UE context release command may release a UE context for the repeater 305-*b* (e.g., the mobile termination element of the repeater 305-*b*). Further, the UE context release command may include an indication to adjust transmission of SSBs. For example, the UE context release command may include a request to deactivate transmission one or more repeater dedicated SSBs (e.g., one or more SSBs of the set of SSBs transmitted in the direction of the repeater 305-*b*).

At 440, the DU 165-*b* may transmit a UE context release complete message to the CU 160-*b*. The UE context release complete message may indicate successful receipt of the UE context release command, and in some examples, confirm release of the UE context. After transmitting the UE context release complete message, the DU 165-*b* may release the UE context of the mobile termination element of the repeater 305-*b* and disconnect from the repeater 305-*b*.

Further, at 445, the DU 165-*b* may deactivate transmission of one or more repeater-dedicated SSBs. That is, the DU 165-*b* may halt transmission of one or more SSBs of the set of SSBs transmitted in the direction of the repeater 305-*b*. In some examples, the UE context release command may trigger the deactivation of the repeater-dedicated SSBs. The DU 165-*b* may associate the UE context of the mobile termination element of the repeater 305-*b* and the transmission of repeater-dedicated SSBs. Thus, when UE context is released, the repeater-dedicated SSBs are released or deactivated as well.

Figure 5:
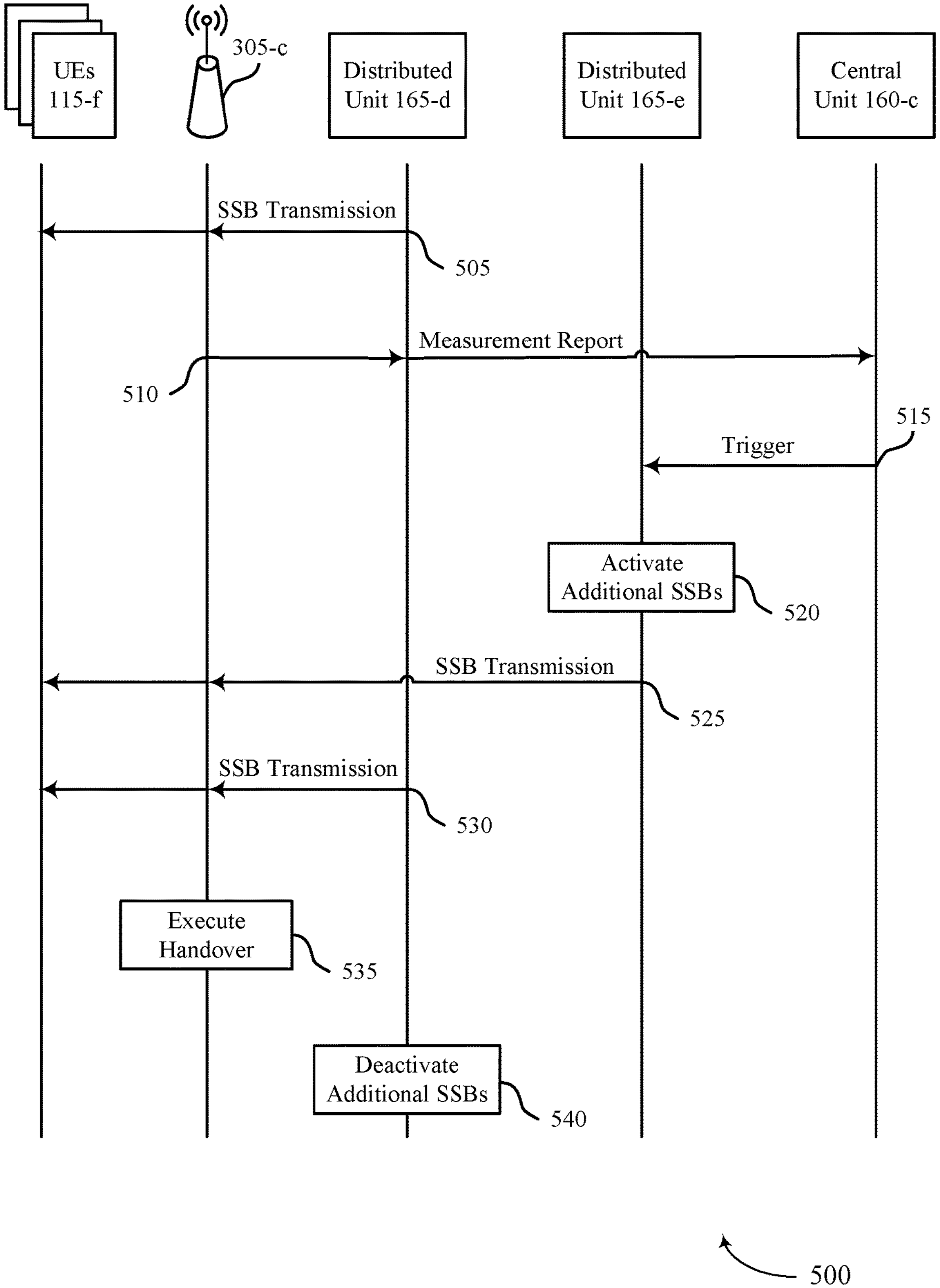

FIG. 5 shows an example of a process flow 500 that supports adjustment of SSB transmissions for repeater device migration in accordance with one or more aspects of the present disclosure. In some examples, the process flow 500 may implement or be implemented by aspects of the wireless communications system 100, the network architecture 200, the wireless communications system 300, or the process flow 400. For example, the process flow 500 may include UEs 115-*f* which may be examples of UEs 115 as described with reference to FIGS. 1 through 4. Further, the process flow 500 may include a DU 165-*d*, a DU 165-*e*, and a CU 160-*c* which may be examples of DUs 165 and a CU 160 as described in FIGS. 2 and 4, respectively. Moreover, the process flow 500 may include a repeater 305-*c* which may be an example of a repeater 305 as described with reference to FIGS. 3 and 4. Alternative examples of the following may be implemented, where some steps are performed in a different order than described or are not performed at all. In some cases, steps may include additional features not mentioned below, or further steps may be added.

In some examples, a wireless communications system may support a disaggregated architecture. In a disaggregated architecture, a network entity may include at least a CU 160 that supports one or more DUs 165. In the example of FIG. 5, a single CU 160-*c* may support a DU 165-*d* and a DU 165-*e*. Further, the DU 165-*d* and the DU 165-*e* may support different cells. For example, the DU 165-*d* may support communication over a first cell and the DU 165-*e* may support communication over a second cell.

In some examples, the DU 165-*d* may establish a connection with the repeater 305-*c* and at 505, the DU 165-*d* may transmit two or more SSBs (e.g., repeater-dedicated SSBs) to the repeater 305-*c* (e.g., using one or more directional beams pointed in the direction of the repeater 305-*c*) and the repeater 305-*c* may forward the two or more SSBs to the UEs 115-*f* (e.g., UEs outside the coverage area of the DU 165-*d*).

At 510, a repeater 305-*c* may transmit a measurement report to DU 165-*d* and the DU 165-*d* may forward the measurement report to the CU 160-*c*. The measurement report may include signal measurements associated with one or both of the first cell (e.g., supported by the DU 165-*d*) or the second cell (e.g., supported by the DU 165-*e*). In some examples, the repeater 305-*c* may measure signals received from one or both of the DU 165-*d* or the DU 165-*e* and transmit the measurement report to the CU 160-*c* according to a periodicity. In some cases, the measurement report may be included in an RRC message. Based on the measurement report, the CU 160-*c* may determine that performing a handover of the repeater 305-*c* from the DU 165-*d* to the DU 165-*e* may be beneficial.

At 515, after determining that the handover may be beneficial, the CU 160-*c* may transmit a trigger to the DU 165-*e*. The trigger may include an indication to adjust transmission of SSBs. For example, the trigger may include a request to activate repeater-dedicated SSBs for transmission by DU 165-*e*. Repeater-dedicated SSBs may be described as a set of two or more SSBs that are transmitted in the direction of the repeater 305-*c*. In some cases, the trigger may be transmitted via non-UE associated signaling.

At 520, the DU 165-*e* may activate the repeater-dedicated SSB transmissions and transmit the repeater-dedicated SSBs to the repeater 305-*b* at 525. The repeater 305-*c* may then fan out the repeater-dedicated SSBs to the UEs 115-*f*. As such, the DU 165-*e* may activate transmission of repeater-dedicated SSB transmissions prior to connecting to the repeater 305-*c*.

In some examples, the repeater 305-*c* may still be connected to DU 165-*d* and at 530, the DU 165-*d* may continue to transmit repeater-dedicated SSBs and the repeater 305-*c* may forward the repeater-dedicated SSBs to the UEs 115-*f* (e.g., during a same time that the DU 165-*e* is transmitting repeater-dedicated SSBs). That is, during a period of time, both the DU 165-*d* and the DU 165-*e* may transmit repeater-dedicated SSBs to the UEs 115-*f*. During this period of time, using the repeater-dedicated SSBs received from the DU 165-*e*, the UEs 115-*f* may obtain some information about the DU 165-*e* which may reduce the chances of a failure due to bind handover and reduce the chance radio link failure (RLF) occurring for the UEs 115-*f* (e.g., UEs not directly served by the DU 165-*d*).

At 535, the repeater 305-*c* may perform a handover operation. In some examples, the repeater 305-*c* may perform the handover procedure upon receiving a handover command from the CU 160-*d* that is received after the DU 165-*e* activates transmission of the repeater-dedicated SSBs. Upon a successful handover procedure, the repeater 305-*c* may be connected to the DU 165-*e* and the repeater 305-*c* may be disconnected from the DU 165-*d*.

At 540, the DU 165-*d* is disconnected from the repeater 305-*c* and deactivate repeater-dedicated SSBs. In some examples, the DU 165-*d* may deactivate the repeater-dedicated SSB upon releasing the UE context of the repeater 305-*c*.

Figure 6:
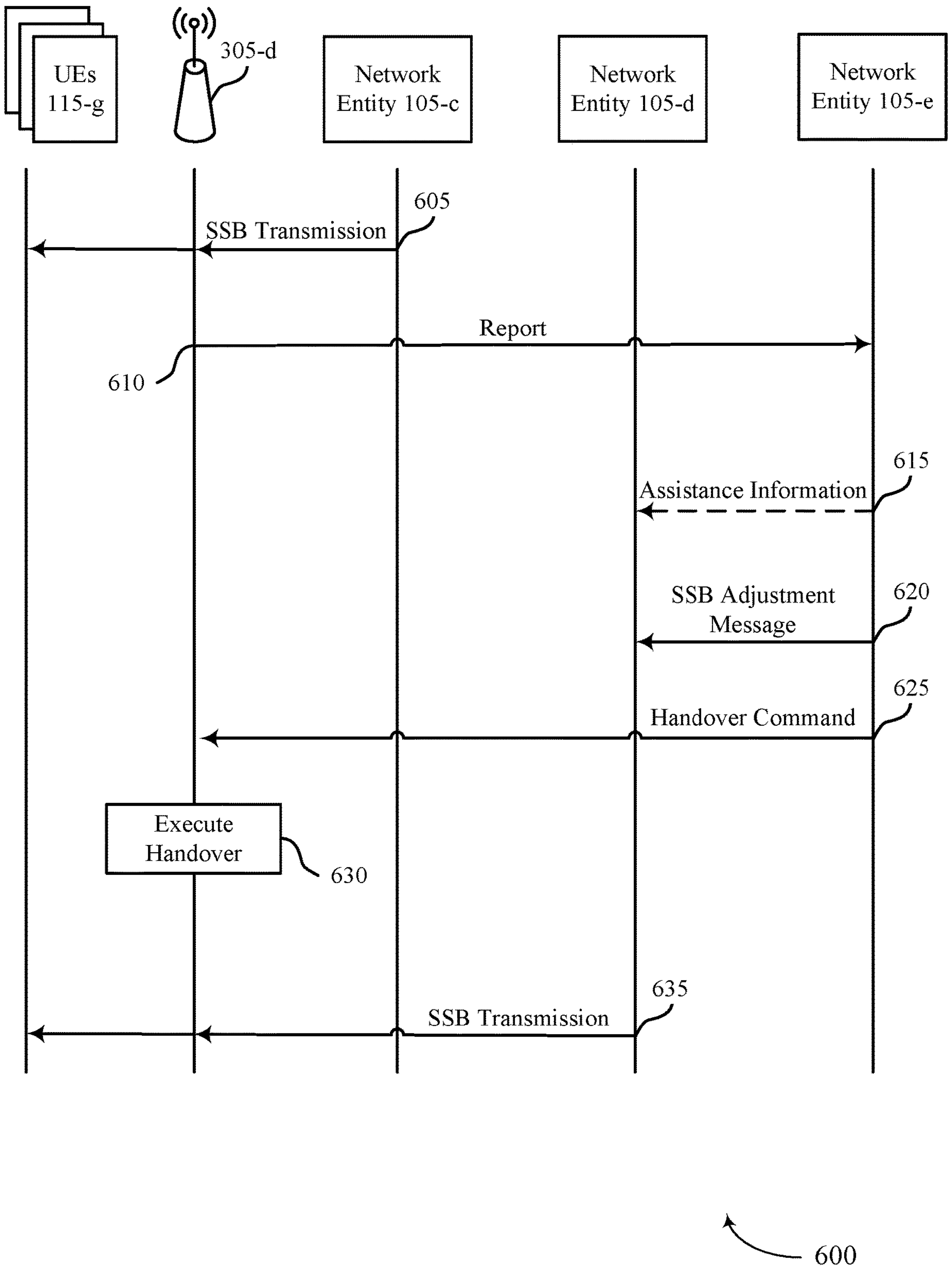

FIG. 6 shows an example of a process flow 600 that supports adjustment of SSB transmissions for repeater device migration in accordance with one or more aspects of the present disclosure. In some examples, the process flow 600 may implement or be implemented by aspects of the wireless communications system 100, the network architecture 200, the wireless communications system 300, the process flow 400, and the process flow 500. For example, the process flow 600 may include UEs 115-*g* which may be examples of UEs 115 as described with reference to FIGS. 1 through 6. Further, the process flow 600 may include a network entity 105-*c*, a network entity 105-*d*, and a network entity 105-*e*, which may be examples of DUs 165 or CUs 160 as described in FIGS. 2, 4, and 5, respectively. Moreover, the process flow 600 may include a repeater 305-*d* which may be an example of a repeater 305 as described with reference to FIGS. 3, 4, and 5. Alternative examples of the following may be implemented, where some steps are performed in a different order than described or are not performed at all. In some cases, steps may include additional features not mentioned below, or further steps may be added.

In one example, the network entity 105-*d* may be an example of a first DU that supports a first cell and the network entity 105-*c* may be an example of a second DU that supports a second cell. Further, the network entity 105-*e* may be an example of a first CU that supports one or both of the network entity 105-*c* or the network entity 105-*d*. In some examples, the network entity 105-*e* may only support the network entity 105-*c* and a second CU may support the network entity 105-*d*. In another example, the network entity 105-*c* and the network entity 105-*d* may be an example of a single DU that supports two different cells. In such example, the network entity 105-*d* may be an example of the DU that supports a first cell and the network entity 105-*c* may be an example of the DU that supports a second cell.

In some examples, the network entity 105-*c* may establish a connection with the repeater 305-*d* and at 605, transmit a first set of SSBs using the second cell. A subset of the first set of SSBs may be SSBs associated with the repeater 305-*d* (e.g., SSBs transmitted in the direction of the repeater 305-*d*). The repeater 305-*d* may then forward the subset of SSBs (e.g., repeater-dedicated SSBs) to the UEs 115-*g*.

At 610, the repeater 305-*d* may transmit a report to the network entity 105-*e*. The report may indicate signal measurements associated with the first cell (e.g., associated with the network entity 105-*d*). Using the measurement report, the network entity 105-*e* may determine to handover the repeater 305-*d* from the network entity 105-*c* to the network entity 105-*d*.

At 615, the network entity 105-*e* may transmit assistance information to the network entity 105-*d*. The assistance information may include information associated with transmission of repeater-dedicated SSBs. For example, the assistance information may indicate a time period over which the network entity 105-*d* transmits one or more repeater-dedicated SSBs using the first cell. Further, the assistance information may indicate a directional beam for repeater-dedicated SSBs. In some examples, the directional beam may be directed towards the repeater device.

At 620, the network entity 105-*e* may transmit an SSB adjustment message to the network entity 105-*d*. The SSB adjustment message may indicate adjust transmission SSBs by the network entity 105-*d* using the first cell. In some examples, prior to receiving the SSB adjustment message, the network entity 105-*d* may transmit a second set of SSBs using different directional beams and transmit a signal to the network entity 105-*d* indicating the second set of SSBs. In such case, the SSB adjustment message may indicate to transmit a third set of SSBs that is greater than the second set of SSBs using the first cell. In some examples, two or more SSBs of the third set of SSB may be associated with the repeater 305-*d* (e.g., repeater-dedicated SSBs). That is, the SSB adjustment message may activate transmission of repeater-dedicated SSBs for the network entity 105-*d*.

In some cases, the SSB adjustment message may indicate to adjust transmission of SSBs after the repeater 305-*d* connects to the first cell. In such example, the SSB adjustment message may be included in UE context setup request message, a UE context modification message, one or more signals included in a handover procedure (e.g., a handover command), or any UE-associated F1AP/XnAP signaling. Additionally or alternatively, the SSB adjustment message may indicate to adjust transmission of the plurality of transmissions prior to the repeater 305-*d* connecting to the first cell. In such example, the SSB adjustment message may be included in a trigger that is send prior to handover.

At 625, the network entity 105-*e* may transmit a handover command to the repeater 305-*d*. The handover command may indicate to perform a handover operation for the repeater 305-*d* from the second cell to the first cell. In some examples, the network entity may transmit the handover command in the second signal based on the measurement report and the SSB adjustment message.

At 630, the repeater 305-*d* may execute handover. After executing the handover, the repeater 305-*c* may disconnect from the network entity 105-*d* and connect to the network entity 105-*d*.

At 635, while the repeater 305-*d* is connected to the network entity 105-*d*, the network entity 105-*d* may transmit the third set of SSBs and the repeater 305-*d* may forward the repeater-dedicated SSBs of the third set of SSBs to the UEs 115-*g*.

In some examples, after the network entity 105-*c* disconnect from the repeater 305-*d*, the network entity 105-*c* may deactivate repeater-dedicated SSB transmission (e.g., refrain from transmitting the subset of the first set of SSBs). In some examples, the network entity 105-*c* may receive a UE context release message and deactivate transmission of the repeater-dedicated SSBs upon receiving the UE context release message.

Figure 7:
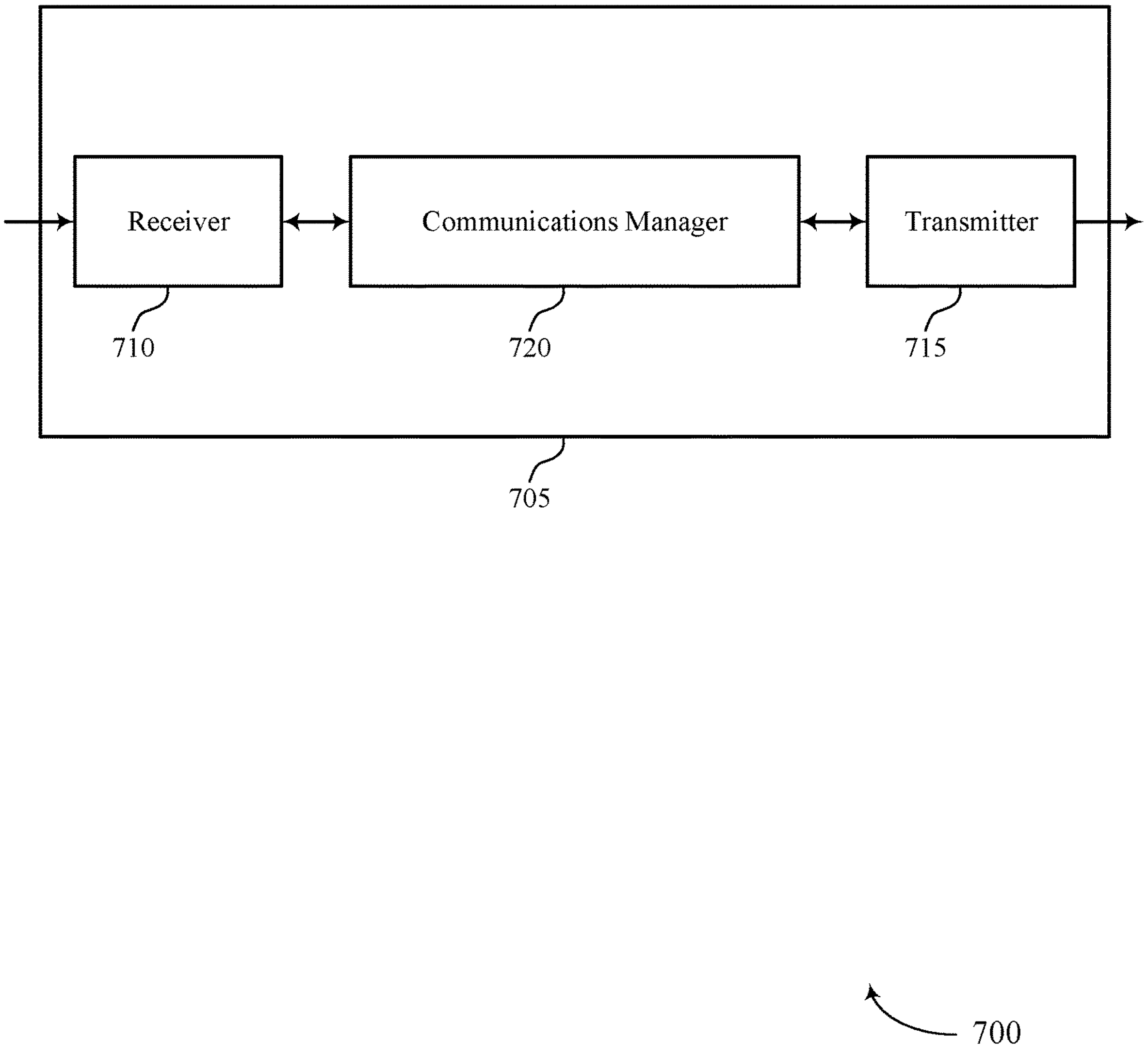
FIGS. 7 and 8 show block diagrams of devices that support adjustment of SSB transmissions for repeater device migration in accordance with one or more aspects of the present disclosure.

FIG. 7 shows a block diagram 700 of a device 705 that supports adjustment of SSB transmissions for repeater device migration in accordance with one or more aspects of the present disclosure. The device 705 may be an example of aspects of a network entity 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 705. In some examples, the receiver 710 may support obtaining information by receiving signals via one or more antennas. Additionally, or alternatively, the receiver 710 may support obtaining information by receiving signals via one or more wired (e.g., electrical, fiber optic) interfaces, wireless interfaces, or any combination thereof.

The transmitter 715 may provide a means for outputting (e.g., transmitting, providing, conveying, sending) information generated by other components of the device 705. For example, the transmitter 715 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 715 may support outputting information by transmitting signals via one or more antennas. Additionally, or alternatively, the transmitter 715 may support outputting information by transmitting signals via one or more wired (e.g., electrical, fiber optic) interfaces, wireless interfaces, or any combination thereof. In some examples, the transmitter 715 and the receiver 710 may be co-located in a transceiver, which may include or be coupled with a modem.

The communications manager 720, the receiver 710, the transmitter 715, or various combinations thereof or various components thereof may be examples of means for performing various aspects of adjustment of SSB transmissions for repeater device migration as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a first network entity in accordance with examples as disclosed herein. For example, the communications manager 720 is capable of, configured to, or operable to support a means for receiving, from a repeater device, a report that indicates signal measurements associated with a first cell. The communications manager 720 is capable of, configured to, or operable to support a means for transmitting, based on the report, a first signal that indicates to adjust transmission of a set of multiple SSBs by a second network entity using the first cell. The communications manager 720 is capable of, configured to, or operable to support a means for transmitting, based on the first signal, a second signal that indicates to perform a handover operation for the repeater device from a second cell to the first cell.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for reduced power consumption.

Figure 8:
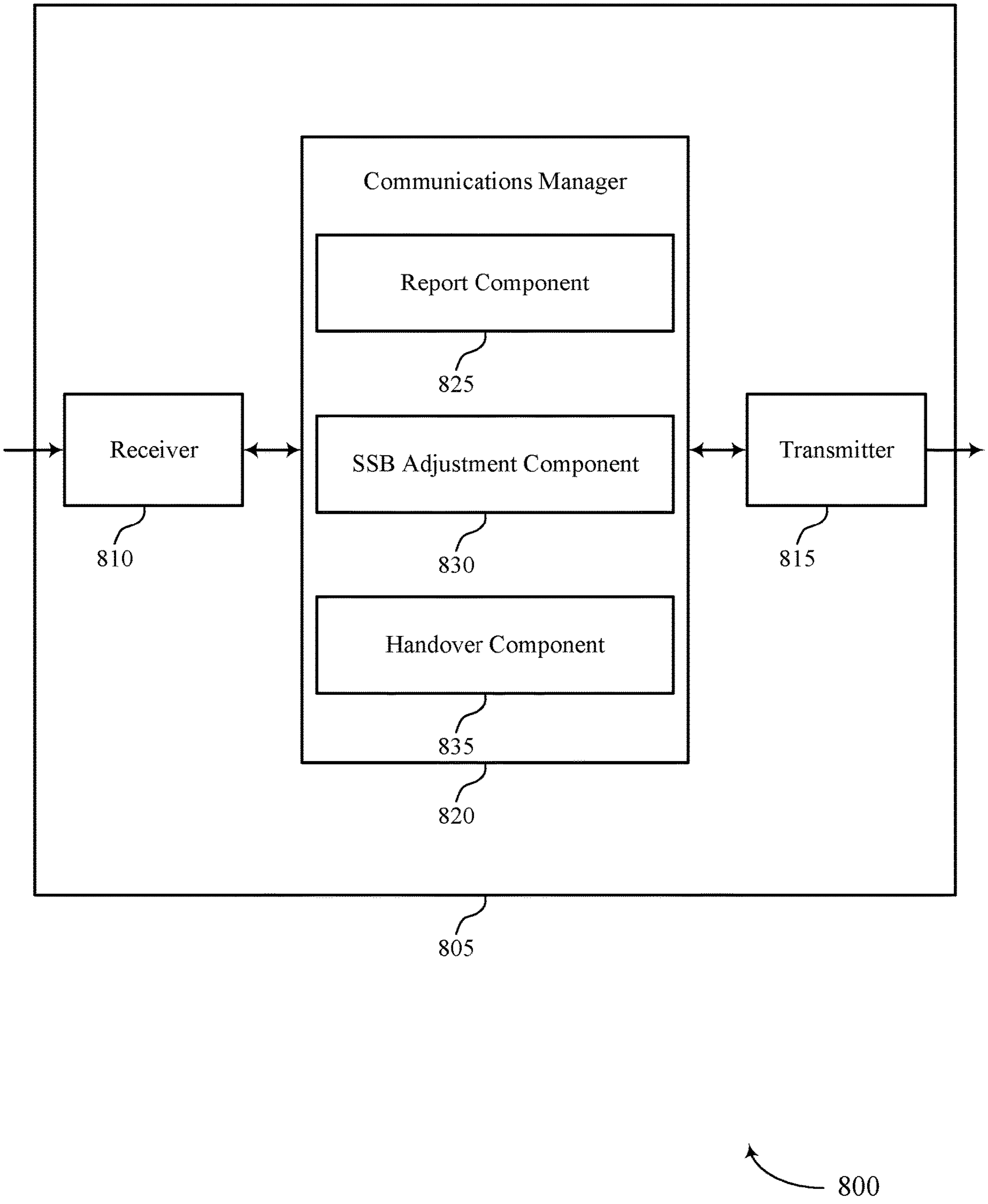

FIG. 8 shows a block diagram 800 of a device 805 that supports adjustment of SSB transmissions for repeater device migration in accordance with one or more aspects of the present disclosure. The device 805 may be an example of aspects of a device 705 or a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The device 805, or various components thereof, may be an example of means for performing various aspects of adjustment of SSB transmissions for repeater device migration as described herein. For example, the communications manager 820 may include a report component 825, an SSB adjustment component 830, a handover component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a first network entity in accordance with examples as disclosed herein. The report component 825 is capable of, configured to, or operable to support a means for receiving, from a repeater device, a report that indicates signal measurements associated with a first cell. The SSB adjustment component 830 is capable of, configured to, or operable to support a means for transmitting, based on the report, a first signal that indicates to adjust transmission of a set of multiple SSBs by a second network entity using the first cell. The handover component 835 is capable of, configured to, or operable to support a means for transmitting, based on the first signal, a second signal that indicates to perform a handover operation for the repeater device from a second cell to the first cell.

Figure 9:
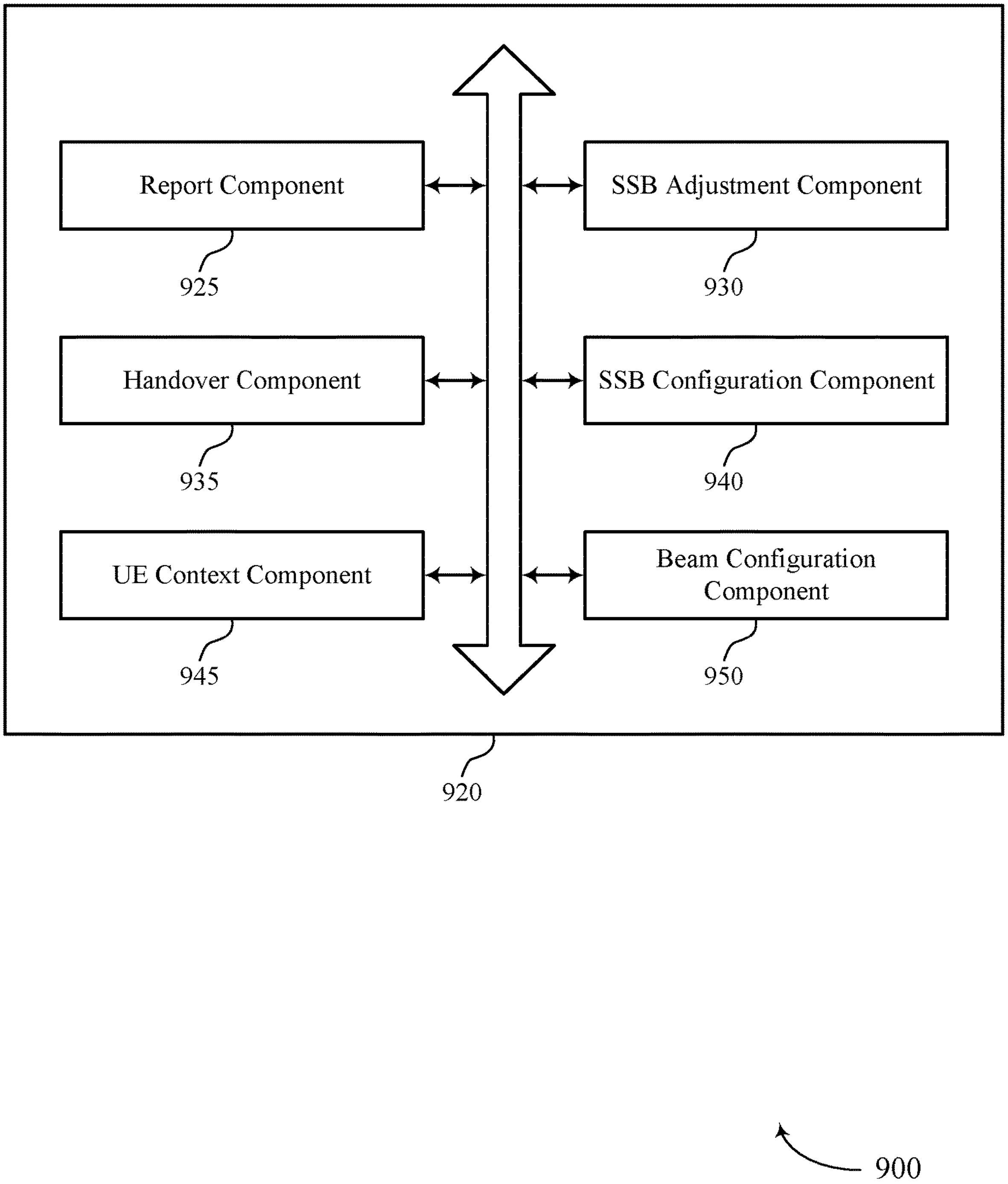
FIG. 9 shows a block diagram of a communications manager that supports adjustment of SSB transmissions for repeater device migration in accordance with one or more aspects of the present disclosure.

FIG. 9 shows a block diagram 900 of a communications manager 920 that supports adjustment of SSB transmissions for repeater device migration in accordance with one or more aspects of the present disclosure. The communications manager 920 may be an example of aspects of a communications manager 720, a communications manager 820, or both, as described herein. The communications manager 920, or various components thereof, may be an example of means for performing various aspects of adjustment of SSB transmissions for repeater device migration as described herein. For example, the communications manager 920 may include a report component 925, an SSB adjustment component 930, a handover component 935, an SSB configuration component 940, a UE context component 945, a beam configuration component 950, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 920 may support wireless communications at a first network entity in accordance with examples as disclosed herein. The report component 925 is capable of, configured to, or operable to support a means for receiving, from a repeater device, a report that indicates signal measurements associated with a first cell. The SSB adjustment component 930 is capable of, configured to, or operable to support a means for transmitting, based on the report, a first signal that indicates to adjust transmission of a set of multiple SSBs by a second network entity using the first cell. The handover component 935 is capable of, configured to, or operable to support a means for transmitting, based on the first signal, a second signal that indicates to perform a handover operation for the repeater device from a second cell to the first cell.

In some examples, the SSB configuration component 940 is capable of, configured to, or operable to support a means for receiving, prior to transmitting the first signal, a third signal that indicates a first quantity of SSBs, where the first signal indicates for the second network entity to transmit a second quantity of SSBs greater than the first quantity of SSBs using the first cell.

In some examples, two or more SSBs of the second quantity of SSBs are associated with the repeater device.

In some examples, the beam configuration component 950 is capable of, configured to, or operable to support a means for transmitting a fourth signal that indicates a directional beam for the two or more SSBs associated with the repeater device, where the directional beam is directed toward the repeater device.

In some examples, the first signal indicates to activate transmission of the two or more SSBs associated with the repeater device using the first cell.

In some examples, the SSB adjustment component 930 is capable of, configured to, or operable to support a means for transmitting a third signal that indicates a time period over which the second network entity transmits one or more SSBs using the first cell. In some examples, the SSB adjustment component 930 is capable of, configured to, or operable to support a means for transmitting a third signal that indicates to deactivate transmission of one or more SSBs associated with the repeater device using the second cell.

In some examples, the UE context component 945 is capable of, configured to, or operable to support a means for transmitting a fourth signal that indicates to release a user equipment context, where the fourth signal includes the third signal. In some examples, the UE context component 945 is capable of, configured to, or operable to support a means for transmitting, based on receiving the report, a third signal requesting to establish a user equipment context, where the third signal includes the first signal. In some examples, the UE context component 945 is capable of, configured to, or operable to support a means for transmitting, based on receiving the report, a third signal requesting to modify a user equipment context, where the third signal includes the first signal.

In some examples, the first signal indicates to adjust transmission of the set of multiple SSBs prior to the repeater device connecting to the first cell or the first signal indicates to adjust transmission of the set of multiple SSBs after the repeater device connects to the first cell.

In some examples, the second network entity includes a distributed unit (DU) that supports the first cell and the second cell. In some examples, the second network entity includes a first distributed unit (DU) that supports the first cell and a third network entity includes a second DU that supports the second cell. In some examples, the first network entity includes first a central unit (CU) that supports the second DU and a fourth network entity includes a second central unit (CU) that supports the first DU.

Figure 10:
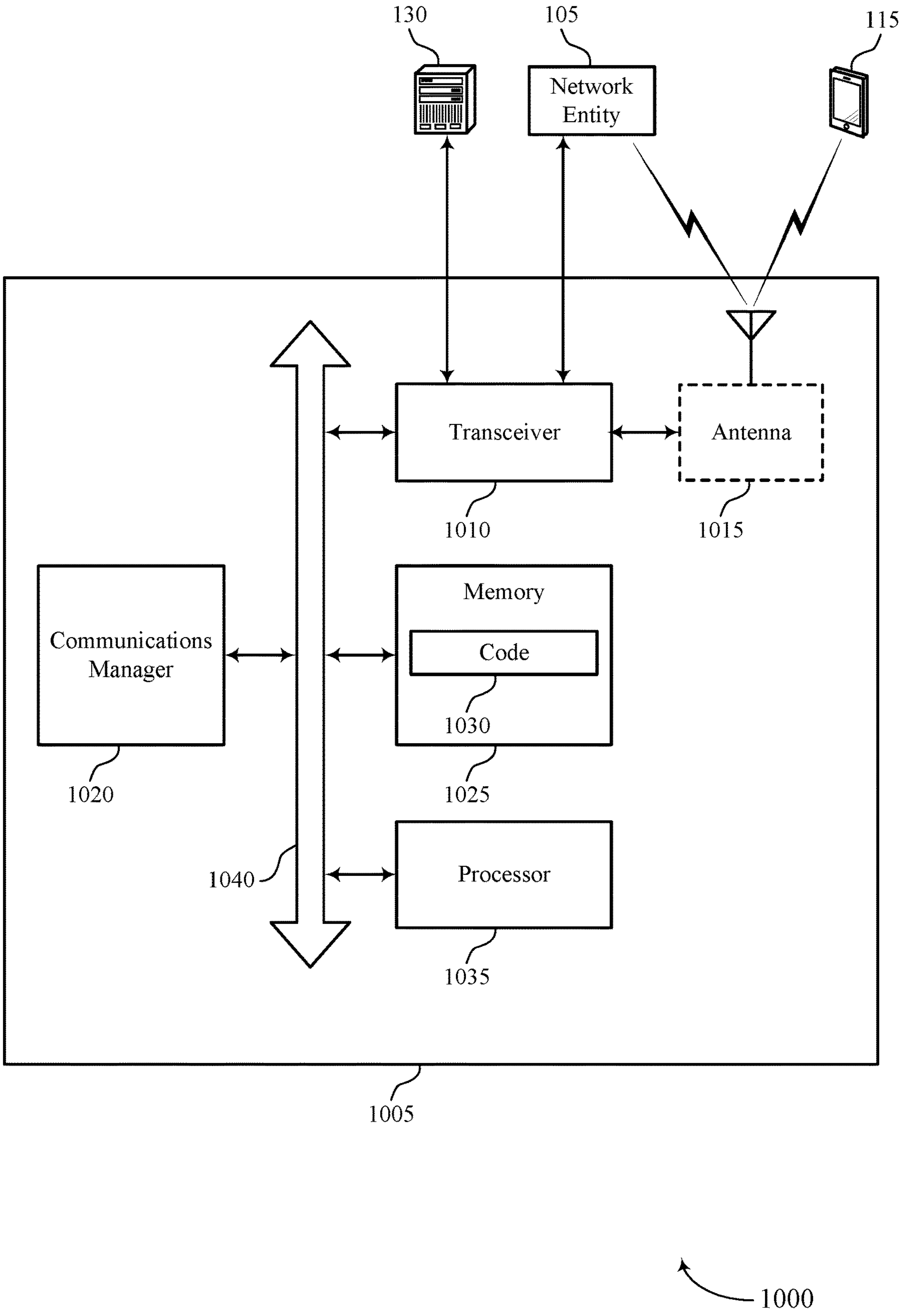
FIG. 10 shows a diagram of a system including a device that supports adjustment of SSB transmissions for repeater device migration in accordance with one or more aspects of the present disclosure.

FIG. 10 shows a diagram of a system 1000 including a device 1005 that supports adjustment of SSB transmissions for repeater device migration in accordance with one or more aspects of the present disclosure. The device 1005 may be an example of or include the components of a device 705, a device 805, or a network entity 105 as described herein. The device 1005 may communicate with one or more network entities 105, one or more UEs 115, or any combination thereof, which may include communications over one or more wired interfaces, over one or more wireless interfaces, or any combination thereof. The device 1005 may include components that support outputting and obtaining communications, such as a communications manager 1020, a transceiver 1010, an antenna 1015, a memory 1025, code 1030, and a processor 1035. These components may be in electronic communication or otherwise coupled (e.g., operatively, communicatively, functionally, electronically, electrically) via one or more buses (e.g., a bus 1040).

The transceiver 1010 may support bi-directional communications via wired links, wireless links, or both as described herein. In some examples, the transceiver 1010 may include a wired transceiver and may communicate bi-directionally with another wired transceiver. Additionally, or alternatively, in some examples, the transceiver 1010 may include a wireless transceiver and may communicate bi-directionally with another wireless transceiver. In some examples, the device 1005 may include one or more antennas 1015, which may be capable of transmitting or receiving wireless transmissions (e.g., concurrently). The transceiver 1010 may also include a modem to modulate signals, to provide the modulated signals for transmission (e.g., by one or more antennas 1015, by a wired transmitter), to receive modulated signals (e.g., from one or more antennas 1015, from a wired receiver), and to demodulate signals. In some implementations, the transceiver 1010 may include one or more interfaces, such as one or more interfaces coupled with the one or more antennas 1015 that are configured to support various receiving or obtaining operations, or one or more interfaces coupled with the one or more antennas 1015 that are configured to support various transmitting or outputting operations, or a combination thereof. In some implementations, the transceiver 1010 may include or be configured for coupling with one or more processors or memory components that are operable to perform or support operations based on received or obtained information or signals, or to generate information or other signals for transmission or other outputting, or any combination thereof. In some implementations, the transceiver 1010, or the transceiver 1010 and the one or more antennas 1015, or the transceiver 1010 and the one or more antennas 1015 and one or more processors or memory components (for example, the processor 1035, or the memory 1025, or both), may be included in a chip or chip assembly that is installed in the device 1005. In some examples, the transceiver may be operable to support communications via one or more communications links (e.g., a communication link 125, a backhaul communication link 120, a midhaul communication link 162, a fronthaul communication link 168).

The memory 1025 may include RAM and ROM. The memory 1025 may store computer-readable, computer-executable code 1030 including instructions that, when executed by the processor 1035, cause the device 1005 to perform various functions described herein. The code 1030 may be stored in a non-transitory computer-readable medium such as system memory or another type of memory. In some cases, the code 1030 may not be directly executable by the processor 1035 but may cause a computer (e.g., when compiled and executed) to perform functions described herein. In some cases, the memory 1025 may contain, among other things, a BIOS which may control basic hardware or software operation such as the interaction with peripheral components or devices.

The processor 1035 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1035 may be configured to operate a memory array using a memory controller. In some other cases, a memory controller may be integrated into the processor 1035. The processor 1035 may be configured to execute computer-readable instructions stored in a memory (e.g., the memory 1025) to cause the device 1005 to perform various functions (e.g., functions or tasks supporting adjustment of SSB transmissions for repeater device migration). For example, the device 1005 or a component of the device 1005 may include a processor 1035 and memory 1025 coupled with the processor 1035, the processor 1035 and memory 1025 configured to perform various functions described herein. The processor 1035 may be an example of a cloud-computing platform (e.g., one or more physical nodes and supporting software such as operating systems, virtual machines, or container instances) that may host the functions (e.g., by executing code 1030) to perform the functions of the device 1005. The processor 1035 may be any one or more suitable processors capable of executing scripts or instructions of one or more software programs stored in the device 1005 (such as within the memory 1025). In some implementations, the processor 1035 may be a component of a processing system. A processing system may generally refer to a system or series of machines or components that receives inputs and processes the inputs to produce a set of outputs (which may be passed to other systems or components of, for example, the device 1005). For example, a processing system of the device 1005 may refer to a system including the various other components or subcomponents of the device 1005, such as the processor 1035, or the transceiver 1010, or the communications manager 1020, or other components or combinations of components of the device 1005. The processing system of the device 1005 may interface with other components of the device 1005, and may process information received from other components (such as inputs or signals) or output information to other components. For example, a chip or modem of the device 1005 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1005 may transmit information output from the chip or modem. Additionally, or alternatively, in some implementations, the one or more interfaces may refer to an interface between the processing system of the chip or modem and a receiver, such that the device 1005 may obtain information or signal inputs, and the information may be passed to the processing system. A person having ordinary skill in the art will readily recognize that a first interface also may obtain information or signal inputs, and a second interface also may output information or signal outputs.

In some examples, a bus 1040 may support communications of (e.g., within) a protocol layer of a protocol stack. In some examples, a bus 1040 may support communications associated with a logical channel of a protocol stack (e.g., between protocol layers of a protocol stack), which may include communications performed within a component of the device 1005, or between different components of the device 1005 that may be co-located or located in different locations (e.g., where the device 1005 may refer to a system in which one or more of the communications manager 1020, the transceiver 1010, the memory 1025, the code 1030, and the processor 1035 may be located in one of the different components or divided between different components).

In some examples, the communications manager 1020 may manage aspects of communications with a core network 130 (e.g., via one or more wired or wireless backhaul links). For example, the communications manager 1020 may manage the transfer of data communications for client devices, such as one or more UEs 115. In some examples, the communications manager 1020 may manage communications with other network entities 105, and may include a controller or scheduler for controlling communications with UEs 115 in cooperation with other network entities 105. In some examples, the communications manager 1020 may support an X2 interface within an LTE/LTE-A wireless communications network technology to provide communication between network entities 105.

The communications manager 1020 may support wireless communications at a first network entity in accordance with examples as disclosed herein. For example, the communications manager 1020 is capable of, configured to, or operable to support a means for receiving, from a repeater device, a report that indicates signal measurements associated with a first cell. The communications manager 1020 is capable of, configured to, or operable to support a means for transmitting, based on the report, a first signal that indicates to adjust transmission of a set of multiple SSBs by a second network entity using the first cell. The communications manager 1020 is capable of, configured to, or operable to support a means for transmitting, based on the first signal, a second signal that indicates to perform a handover operation for the repeater device from a second cell to the first cell.

By including or configuring the communications manager 1020 in accordance with examples as described herein, the device 1005 may support techniques for reduced latency and reduced power consumption.

In some examples, the communications manager 1020 may be configured to perform various operations (e.g., receiving, obtaining, monitoring, outputting, transmitting) using or otherwise in cooperation with the transceiver 1010, the one or more antennas 1015 (e.g., where applicable), or any combination thereof. Although the communications manager 1020 is illustrated as a separate component, in some examples, one or more functions described with reference to the communications manager 1020 may be supported by or performed by the transceiver 1010, the processor 1035, the memory 1025, the code 1030, or any combination thereof. For example, the code 1030 may include instructions executable by the processor 1035 to cause the device 1005 to perform various aspects of adjustment of SSB transmissions for repeater device migration as described herein, or the processor 1035 and the memory 1025 may be otherwise configured to perform or support such operations.

Figure 11:
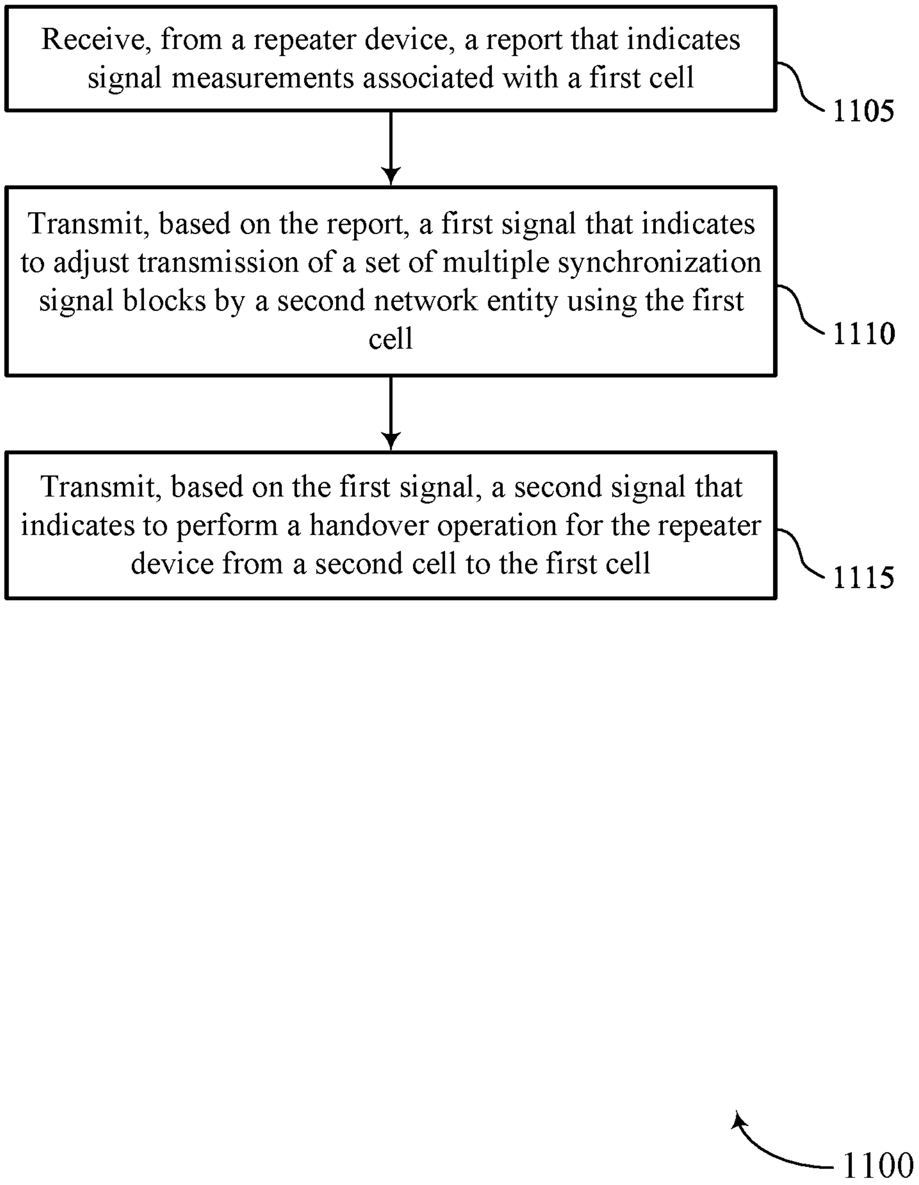
FIGS. 11 and 12 show flowcharts illustrating methods that support adjustment of SSB transmissions for repeater device migration in accordance with one or more aspects of the present disclosure.

FIG. 11 shows a flowchart illustrating a method 1100 that supports adjustment of SSB transmissions for repeater device migration in accordance with aspects of the present disclosure. The operations of the method 1100 may be implemented by a network entity or its components as described herein. For example, the operations of the method 1100 may be performed by a network entity as described with reference to FIGS. 1 through 10. In some examples, a network entity may execute a set of instructions to control the functional elements of the wireless network entity to perform the described functions. Additionally, or alternatively, the wireless network entity may perform aspects of the described functions using special-purpose hardware.

At 1105, the method may include receiving, from a repeater device, a report that indicates signal measurements associated with a first cell. The operations of 1105 may be performed in accordance with examples as disclosed herein. In some examples, aspects of the operations of 1105 may be performed by a report component 925 as described with reference to FIG. 9.

At 1110, the method may include transmitting, based on the report, a first signal that indicates to adjust transmission of a set of multiple SSBs by a second network entity using the first cell. The operations of 1110 may be performed in accordance with examples as disclosed herein. In some examples, aspects of the operations of 1110 may be performed by an SSB adjustment component 930 as described with reference to FIG. 9.

At 1115, the method may include transmitting, based on the first signal, a second signal that indicates to perform a handover operation for the repeater device from a second cell to the first cell. The operations of 1115 may be performed in accordance with examples as disclosed herein. In some examples, aspects of the operations of 1115 may be performed by a handover component 935 as described with reference to FIG. 9.

Figure 12:
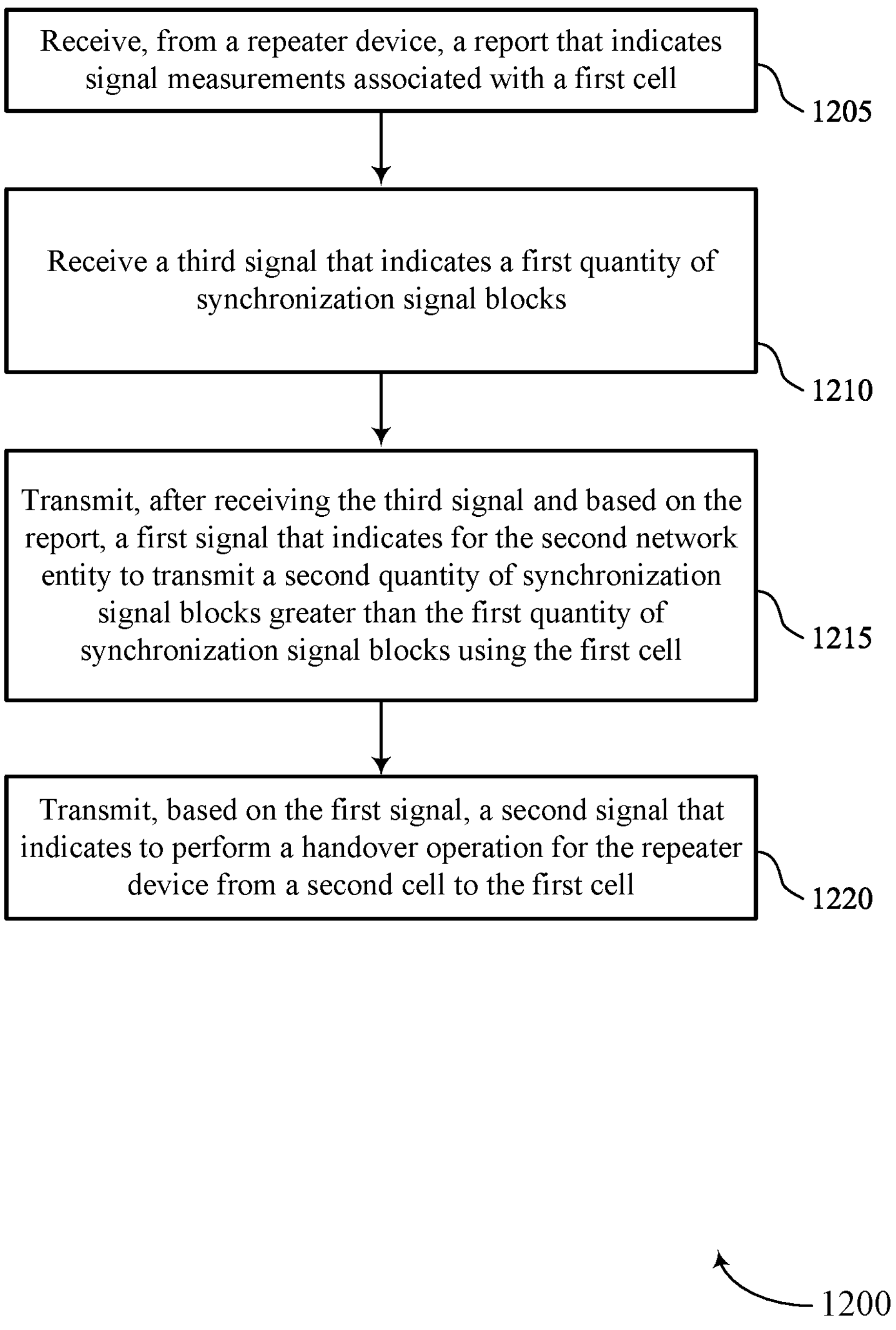

FIG. 12 shows a flowchart illustrating a method 1200 that supports adjustment of SSB transmissions for repeater device migration in accordance with aspects of the present disclosure. The operations of the method 1200 may be implemented by a network entity or its components as described herein. For example, the operations of the method 1200 may be performed by a network entity as described with reference to FIGS. 1 through 10. In some examples, a network entity may execute a set of instructions to control the functional elements of the wireless network entity to perform the described functions. Additionally, or alternatively, the wireless network entity may perform aspects of the described functions using special-purpose hardware.

At 1205, the method may include receiving, from a repeater device, a report that indicates signal measurements associated with a first cell. The operations of 1205 may be performed in accordance with examples as disclosed herein. In some examples, aspects of the operations of 1205 may be performed by a report component 925 as described with reference to FIG. 9.

At 1210, the method may include receiving a third signal that indicates a first quantity of SSBs. The operations of 1210 may be performed in accordance with examples as disclosed herein. In some examples, aspects of the operations of 1210 may be performed by an SSB configuration component 940 as described with reference to FIG. 9.

At 1215, the method may include transmitting, after the third signal and based on the report, a first signal that indicates for the second network entity to transmit a second quantity of synchronization signal blocks greater than the first quantity of synchronization signal blocks using the first cell. The operations of 1215 may be performed in accordance with examples as disclosed herein. In some examples, aspects of the operations of 1215 may be performed by an SSB adjustment component 930 as described with reference to FIG. 9.

At 1220, the method may include transmitting, based on the first signal, a second signal that indicates to perform a handover operation for the repeater device from a second cell to the first cell. The operations of 1220 may be performed in accordance with examples as disclosed herein. In some examples, aspects of the operations of 1220 may be performed by a handover component 935 as described with reference to FIG. 9.

The following provides an overview of aspects of the present disclosure:

Aspect 1: A method for wireless communications at a first network entity, comprising: receiving, from a repeater device, a report that indicates signal measurements associated with a first cell; transmitting, based at least in part on the report, a first signal that indicates to adjust transmission of a plurality of synchronization signal blocks (SSBs) by a second network entity using the first cell; and transmitting, based at least in part on the first signal, a second signal that indicates to perform a handover operation for the repeater device from a second cell to the first cell.

Aspect 2: The method of aspect 1, further comprising: receiving, prior to transmitting the first signal, a third signal that indicates a first quantity of SSBs, wherein the first signal indicates for the second network entity to transmit a second quantity of SSBs greater than the first quantity of SSBs using the first cell.

Aspect 3: The method of aspect 2, wherein two or more SSBs of the second quantity of SSBs are associated with the repeater device.

Aspect 4: The method of aspect 3, further comprising: transmitting a fourth signal that indicates a directional beam for the two or more SSBs associated with the repeater device, wherein the directional beam is directed towards the repeater device.

Aspect 5: The method of any of aspects 3 through 4, wherein the first signal indicates to activate transmission of the two or more SSBs associated with the repeater device using the first cell.

Aspect 6: The method of any of aspects 1 through 5, further comprising: transmitting a third signal that indicates a time period over which the second network entity transmits one or more SSBs using the first cell.

Aspect 7: The method of any of aspects 1 through 6, further comprising: transmitting a third signal that indicates to deactivate transmission of one or more SSBs associated with the repeater device using the second cell.

Aspect 8: The method of aspect 7, further comprising: transmitting a fourth signal that indicates to release a user equipment (UE) context, wherein the fourth signal comprises the third signal.

Aspect 9: The method of any of aspects 1 through 8, further comprising: transmitting, based at least in part on receiving the report, a third signal requesting to establish a UE context, wherein the third signal comprises the first signal.

Aspect 10: The method of any of aspects 1 through 8, further comprising: transmitting, based at least in part on receiving the report, a third signal requesting to modify a UE context, wherein the third signal comprises the first signal.

Aspect 11: The method of any of aspects 1 through 10, wherein the first signal indicates to adjust transmission of the plurality of SSBs prior to the repeater device connecting to the first cell or the first signal indicates to adjust transmission of the plurality of SSBs after the repeater device connects to the first cell.

Aspect 12: The method of any of aspects 1 through 11, wherein the second network entity comprises a distributed unit (DU) that supports the first cell and the second cell.

Aspect 13: The method of any of aspects 1 through 11, wherein the second network entity comprises a first DU that supports the first cell and a third network entity comprises a second DU that supports the second cell.

Aspect 14: The method of aspect 13, wherein the first network entity comprises first a central unit (CU) that supports the second DU and a fourth network entity comprises a second CU that supports the first DU.

Aspect 15: An apparatus for wireless communications at a first network entity, comprising a processor; memory coupled with the processor; and instructions stored in the memory and executable by the processor to cause the apparatus to perform a method of any of aspects 1 through 14.

Aspect 16: An apparatus for wireless communications at a first network entity, comprising at least one means for performing a method of any of aspects 1 through 14.

Aspect 17: A non-transitory computer-readable medium storing code for wireless communications at a first network entity, the code comprising instructions executable by a processor to perform a method of any of aspects 1 through 14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a first network entity, comprising:
- a processor;
- memory coupled with the processor; and
- instructions stored in the memory and executable by the processor to cause the apparatus to:
  - receive, from a repeater device, a report that indicates signal measurements associated with a first cell;
  - transmit, based at least in part on the report, a first signal that indicates to activate transmission of two or more synchronization signal blocks to the repeater device using the first cell by a second network entity using the first cell, wherein the first signal indicates for the second network entity to transmit a second quantity of synchronization signal blocks greater than a first quantity of synchronization signal blocks using the first cell based at least in part on activation of the two or more synchronization signal blocks to the repeater device; and
  - transmit, based at least in part on the report and on the first signal indicating activation of the two or more synchronization signal blocks to the repeater device, a second signal that indicates to perform a handover operation for the repeater device from a second cell to the first cell.

2. The apparatus of claim 1, wherein the instructions are further executable by the processor to cause the apparatus to:
- receive, prior to transmitting the first signal, a third signal that indicates the first quantity of synchronization signal blocks.

3. The apparatus of claim 1, wherein two or more synchronization signal blocks of the second quantity of synchronization signal blocks are associated with the repeater device.

4. The apparatus of claim 3, wherein the instructions are further executable by the processor to cause the apparatus to:
- transmit a fourth signal that indicates a directional beam for the two or more synchronization signal blocks associated with the repeater device, wherein the directional beam is directed towards the repeater device.

5. The apparatus of claim 1, wherein the instructions are further executable by the processor to cause the apparatus to:
- transmit a third signal that indicates a time period over which the second network entity transmits one or more synchronization signal blocks using the first cell.

6. The apparatus of claim 1, wherein the instructions are further executable by the processor to cause the apparatus to:
- transmit a third signal that indicates to deactivate transmission of one or more synchronization signal blocks associated with the repeater device using the second cell.

7. The apparatus of claim 6, wherein the instructions are further executable by the processor to cause the apparatus to:
- transmit a fourth signal that indicates to release a user equipment context, wherein the fourth signal comprises the third signal.

8. The apparatus of claim 1, wherein the instructions are further executable by the processor to cause the apparatus to:

transmit, based at least in part on receiving the report, a third signal requesting to establish a user equipment context, wherein the third signal comprises the first signal.

9. The apparatus of claim 1, wherein the instructions are further executable by the processor to cause the apparatus to:

transmit, based at least in part on receiving the report, a third signal requesting to modify a user equipment context, wherein the third signal comprises the first signal.

10. The apparatus of claim 1, wherein the first signal indicates to activate transmission of the two or more synchronization signal blocks to the repeater device prior to the repeater device connecting to the first cell or the first signal indicates to activate transmission of the two or more synchronization signal blocks to the repeater device after the repeater device connects to the first cell.

11. The apparatus of claim 1, wherein the second network entity comprises a distributed unit (DU) that supports the first cell and the second cell.

12. The apparatus of claim 1, wherein the second network entity comprises a first distributed unit (DU) that supports the first cell and a third network entity comprises a second DU that supports the second cell.

13. The apparatus of claim 12, wherein the first network entity comprises first a central unit (CU) that supports the second DU and a fourth network entity comprises a second central unit (CU) that supports the first DU.

14. A method for wireless communications at a first network entity, comprising:

receiving, from a repeater device, a report that indicates signal measurements associated with a first cell;

transmitting, based at least in part on the report, a first signal that indicates to activate transmission of two or more synchronization signal blocks to the repeater device using the first cell by a second network entity using the first cell, wherein the first signal indicates for the second network entity to transmit a second quantity of synchronization signal blocks greater than a first quantity of synchronization signal blocks using the first cell based at least in part on activation of the two or more synchronization signal blocks to the repeater device; and transmitting, based at least in part on the report and on the first signal indicating activation of the two or more synchronization signal blocks to the repeater device, a second signal that indicates to perform a handover operation for the repeater device from a second cell to the first cell.

15. The method of claim 14, further comprising:

receiving, prior to transmitting the first signal, a third signal that indicates the first quantity of synchronization signal blocks.

16. The method of claim 14, wherein two or more synchronization signal blocks of the second quantity of synchronization signal blocks are associated with the repeater device.

17. The method of claim 16, further comprising:

transmitting a fourth signal that indicates a directional beam for the two or more synchronization signal blocks associated with the repeater device, wherein the directional beam is directed towards the repeater device.

18. The method of claim 14, further comprising:

transmitting a third signal that indicates a time period over which the second network entity transmits one or more synchronization signal blocks using the first cell.

19. The method of claim 14, further comprising:

transmitting a third signal that indicates to deactivate transmission of one or more synchronization signal blocks associated with the repeater device using the second cell.

20. The method of claim 19, further comprising:

transmitting a fourth signal that indicates to release a user equipment context, wherein the fourth signal comprises the third signal.

21. The method of claim 14, further comprising:

transmitting, based at least in part on receiving the report, a third signal requesting to establish a user equipment context, wherein the third signal comprises the first signal.

22. The method of claim 14, further comprising:

transmitting, based at least in part on receiving the report, a third signal requesting to modify a user equipment context, wherein the third signal comprises the first signal.

23. The method of claim 14, wherein the first signal indicates to activate transmission of the two or more synchronization signal blocks to the repeater device prior to the repeater device connecting to the first cell or the first signal indicates to activate transmission of the two or more synchronization signal blocks to the repeater device after the repeater device connects to the first cell.

24. The method of claim 14, wherein the second network entity comprises a distributed unit (DU) that supports the first cell and the second cell.

25. An apparatus for wireless communications at a first network entity, comprising:

means for receiving, from a repeater device, a report that indicates signal measurements associated with a first cell;

means for transmitting, based at least in part on the report, a first signal that indicates to activate transmission of two or more synchronization signal blocks to the repeater device using the first cell by a second network entity using the first cell, wherein the first signal indicates for the second network entity to transmit a second quantity of synchronization signal blocks greater than a first quantity of synchronization signal blocks using the first cell based at least in part on activation of the two or more synchronization signal blocks to the repeater device; and means for transmitting, based at least in part on the report and on the first signal indicating activation of the two or more synchronization signal blocks to the repeater device, a second signal that indicates to perform a handover operation for the repeater device from a second cell to the first cell.

26. The apparatus of claim 25, further comprising:

means for receiving, prior to transmitting the first signal, a third signal that indicates the first quantity of synchronization signal blocks.

27. A non-transitory computer-readable medium storing code for wireless communications at a first network entity, the code comprising instructions executable by a processor to:

receive, from a repeater device, a report that indicates signal measurements associated with a first cell;

transmit, based at least in part on the report, a first signal that indicates to activate transmission of two or more synchronization signal blocks to the repeater device using the first cell by a second network entity using the first cell, wherein the first signal indicates for the second network entity to transmit a second quantity of synchronization signal blocks greater than a first quantity of synchronization signal blocks using the first cell based at least in part on activation of the two or more synchronization signal blocks to the repeater device; and transmit, based at least in part on the report and on the first signal indicating activation of the two or more synchronization signal blocks to the repeater device, a second signal that indicates to perform a handover operation for the repeater device from a second cell to the first cell.

28. The non-transitory computer-readable medium of claim 27, wherein the instructions are further executable by the processor to:

receive, prior to transmitting the first signal, a third signal that indicates the first quantity of synchronization signal blocks.

* * * * *